United States Patent
Smith et al.

(10) Patent No.: US 9,349,063 B2
(45) Date of Patent: May 24, 2016

(54) SYSTEM AND METHOD FOR CAPTURING TOKEN DATA WITH A PORTABLE COMPUTING DEVICE

(75) Inventors: Steven M. Smith, Atlanta, GA (US); Robert L. Dessert, Atlanta, GA (US)

(73) Assignee: QUALCOMM Incorporated, San Diego, CA (US)

( * ) Notice: Subject to any disclaimer, the term of this patent is extended or adjusted under 35 U.S.C. 154(b) by 645 days.

(21) Appl. No.: 13/048,422

(22) Filed: Mar. 15, 2011

(65) Prior Publication Data

US 2012/0099780 A1 Apr. 26, 2012

Related U.S. Application Data

(60) Provisional application No. 61/405,722, filed on Oct. 22, 2010.

(51) Int. Cl.
*G06K 9/00* (2006.01)
*G06K 9/20* (2006.01)
(Continued)

(52) U.S. Cl.
CPC .............. *G06K 9/2063* (2013.01); *G06K 9/228* (2013.01); *G06Q 20/108* (2013.01); *G06Q 20/12* (2013.01); *G06Q 20/322* (2013.01); *G06Q 20/3274* (2013.01); *G06Q 20/3276* (2013.01); *G06Q 20/34* (2013.01); *G06Q 20/363* (2013.01); *G06K 2209/01* (2013.01)

(58) Field of Classification Search
USPC ..................................... 382/306, 313; 705/41
See application file for complete search history.

(56) References Cited

U.S. PATENT DOCUMENTS 5,513,272 A * 4/1996 Bogosian, Jr. ................ 382/116
7,010,565 B2 * 3/2006 Sampson ...................... 709/202
(Continued)

FOREIGN PATENT DOCUMENTS

EP 0616296 A2 9/1994
GB 2287819 A 9/1995
(Continued)

OTHER PUBLICATIONS

Anonymous: "Scanshell pro OCR", Internet Citation, Mar. 28, 2010, p. 1, XP002662245, Retrieved from the Internet: URL:http://www.card-scanner.com/scanshell-proocr.html [retrieved on Nov. 26, 2011], the whole document.

(Continued)

*Primary Examiner* — Vikkram Bali
(74) *Attorney, Agent, or Firm* — Nicholas A. Cole

(57) ABSTRACT

A system and method for collecting and managing information taken from tokens, like credit cards and gift cards, includes a portable computing device (PCD). The PCD may support a token recognizer that may comprise hardware and/or software that may reside in memory of the PCD. The token recognizer may work in combination with a camera. The token recognizer may comprise a broad recognizer module and an optical character recognition ("OCR") module. The camera of the PCD may capture images of one or more physical tokens. These captured images of the physical tokens may be processed by the token recognizer so that digital images as well as data provided by the physical tokens may be maintained in memory of the PCD for later presentation to the user. These later presentations on the PCD may be used for account management and for conducting transactions, such as making payment at a point-of-sale (POS) terminal.

20 Claims, 16 Drawing Sheets

(51) Int. Cl.
*G06K 9/22* (2006.01)
*G06Q 20/12* (2012.01)
*G06Q 20/32* (2012.01)
*G06Q 20/34* (2012.01)
*G06Q 20/36* (2012.01)
*G06Q 20/10* (2012.01)

(56) References Cited

U.S. PATENT DOCUMENTS

| | | | |
|---|---|---|---|
| 7,023,984 | B1 | 4/2006 | Short et al. |
| 8,109,648 | B2* | 2/2012 | Laso et al. ............... 362/217.13 |
| 8,380,177 | B2* | 2/2013 | Laracey .................... 455/414.1 |
| 2001/0041009 | A1 | 11/2001 | Lee |
| 2007/0098184 | A1 | 5/2007 | Ibe |
| 2008/0086417 | A1* | 4/2008 | Bykov et al. ...................... 705/40 |
| 2008/0126415 | A1* | 5/2008 | Chaudhury et al. ....... 707/104.1 |
| 2008/0247678 | A1* | 10/2008 | Okamoto et al. ............. 382/306 |
| 2009/0132590 | A1* | 5/2009 | Huang ....................... 707/104.1 |
| 2009/0156180 | A1 | 6/2009 | Slavin et al. |
| 2009/0173784 | A1* | 7/2009 | Yang ............................. 235/380 |
| 2009/0222459 | A1 | 9/2009 | Steinberg |
| 2009/0234773 | A1 | 9/2009 | Hasson |
| 2009/0240626 | A1 | 9/2009 | Hasson et al. |
| 2011/0155799 | A1* | 6/2011 | Meszaros et al. ............. 235/379 |
| 2013/0086389 | A1* | 4/2013 | Suwald ......................... 713/185 |
| 2015/0093048 | A1 | 4/2015 | Smith |

FOREIGN PATENT DOCUMENTS

| | | |
|---|---|---|
| JP | 2002015122 A | 1/2002 |
| JP | 2005208819 A | 8/2005 |
| JP | 2008282094 A | 11/2008 |
| JP | 2008299748 A | 12/2008 |
| KR | 20010084889 A | 9/2001 |
| WO | WO9847098 A1 | 10/1998 |
| WO | 2007081147 | 7/2007 |

OTHER PUBLICATIONS

International Search Report and Written Opinion—PCT/US2011/051084—ISA/EPO—Jan. 26, 2012.

* cited by examiner

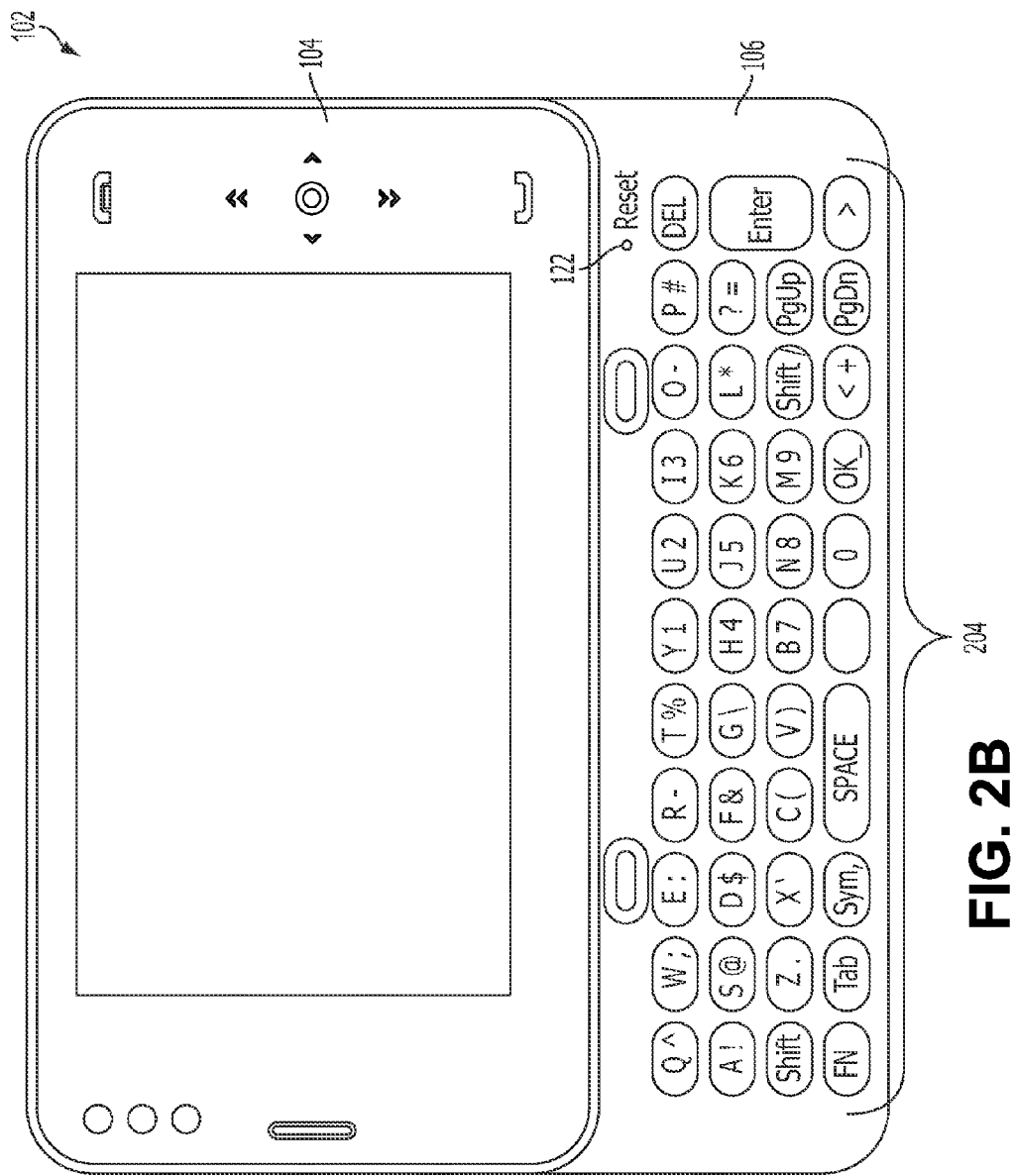

SYSTEM AND METHOD FOR CAPTURING TOKEN DATA WITH A PORTABLE COMPUTING DEVICE

PRIORITY CLAIM AND RELATED APPLICATION STATEMENT

This application claims priority under 35 U.S.C. §119(e) to U.S. Provisional Patent Application Ser. No. 61/405,722, filed on Oct. 22, 2010, entitled, "System and method for capturing token data with a portable computing device," the entire contents of which are hereby incorporated by reference.

DESCRIPTION OF THE RELATED ART

Portable computing devices (PCDs) are becoming necessities for people on personal and professional levels. These devices may include cellular telephones, portable digital assistants (PDAs), portable game consoles, palmtop computers, and other portable electronic devices.

PCDs are often utilized to conduct financial transactions. For example, PCDs may be used to check bank account balances, transfer funds between bank accounts, and for paying bills. While PCDs are useful for these types of transactions, there is a growing need in the art for utilizing PCDs in other types of transactions.

These other types of transactions may include those in which physical tokens, such as credit cards, gift cards, and stored value cards, are typically used. One problem faced by many consumers is that each consumer may be issued a separate account corresponding to a single merchant or single service provider. Often, the merchant or service provider will send each consumer a physical token that corresponds to the account. Each physical token typically has account information provided on it as well as machine-readable codes so that point-of-sale ("POS") terminals can easily process these machine-readable codes.

In addition to machine-readable codes, each physical token usually has human-readable codes as a back-up for the machine-readable code if the machine-readable code fails for a particular transaction. In some instances, a merchant or service provider may not have a machine reader to read the machine-readable code. In such scenarios, the human-readable code may be used.

Physical tokens may also be required by merchants or service providers as a form of identification of the consumer and his or her corresponding account. Often, physical tokens may be required by a merchant or service provider so that any value associated with the token may be redeemed by the consumer.

If a consumer has a plurality of accounts, such as on the order of five or more, then the consumer will likely carry the same amount of physical tokens on his or her person. This can be problematic because the physical tokens do consume space and do require the consumer to remember to carry them on his or her person. If a consumer has ten or more accounts which corresponds to ten or more physical tokens, then the management of these physical tokens becomes significantly burdensome and problematic for the consumer.

Accordingly, what is needed is a system and method that may overcome the problems associated with physical tokens. Specifically, a system and method is needed for eliminating the use of physical tokens for various types of transactions so that a consumer may track one or more accounts with merchants and/or service providers with ease.

SUMMARY OF THE DISCLOSURE

A system and method for collecting and managing information taken from tokens, like credit cards and gift cards, includes a portable computing device (PCD). The PCD may support a token recognizer that may comprise hardware and/or software that may reside in memory of the PCD. The token recognizer may work in combination with a camera. The token recognizer may comprise a broad recognizer module and an optical character recognition ("OCR") module. The camera of the PCD may capture images of one or more physical tokens. These captured images of the physical tokens may be processed by the token recognizer so that digital images as well as data provided by the physical tokens may be maintained in memory of the PCD for later presentation to the user. These later presentations on the PCD may be used for account management and for conducting transactions, such as making payment at a point-of-sale (POS) terminal.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 2B is a front plan view of the first aspect of a PCD in an open position;

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") wireless technology, greater bandwidth availability has enabled more portable computing devices with a greater variety of wireless capabilities. Therefore, a portable computing device ("PCD") may include a cellular telephone, a pager, a PDA, a smartphone, a navigation device, or a hand-held computer with a wireless connection or link.

Figure 1A:
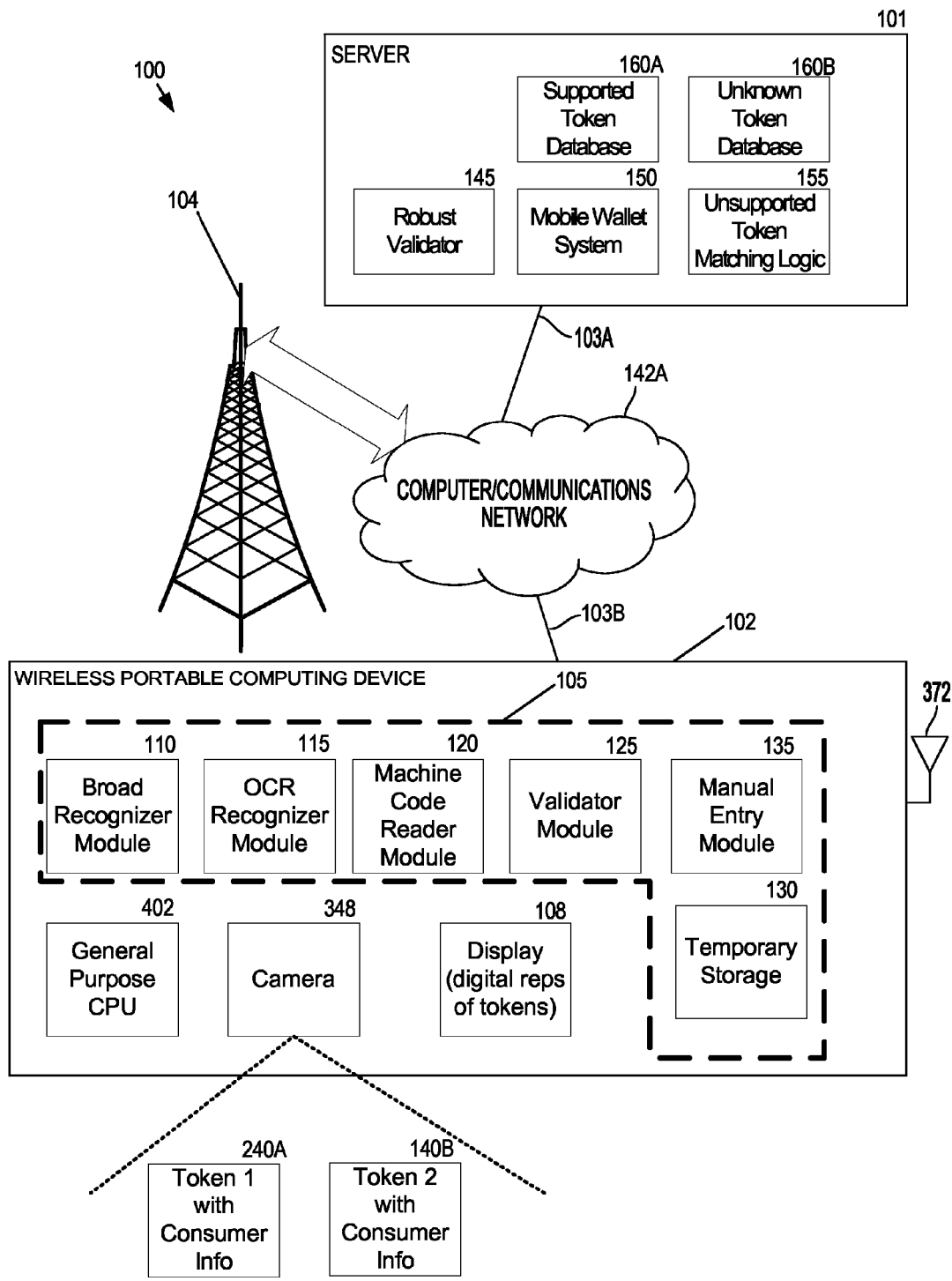
FIG. 1A is a diagram of a wireless portable computing device (PCD) coupled to a wireless communications network which are integral parts of a system for capturing token data with the portable computing device.

Referring initially to FIG. 1A, this FIG. is a diagram of a wireless portable computing device (PCD) 102 coupled to a wireless communications network 142A via a communication link 103A which are integral parts of a system 100 for capturing and managing token data with the PCD 102. Many of the system elements illustrated in FIG. 1 are coupled via communications links 103 to the communications network 142A.

The links 103 illustrated in FIG. 1 may comprise wired or wireless links. Wireless links include, but are not limited to, radio-frequency ("RF") links, infrared links, acoustic links, and other wireless mediums. The communications network 142A may comprise a wide area network ("WAN"), a local area network ("LAN"), the Internet, a Public Switched Telephony Network ("PSTN"), a paging network, or a combination thereof. The communications network 142A may be established by broadcast RF transceiver towers 104. However, one of ordinary skill in the art recognizes that other types of communication devices besides broadcast RF transceiver towers 104 are included within the scope of the invention for establishing the communications network 142A. The PCD 102 is shown to have an antenna 372 (see FIG. 2C) so that a respective PCD 102 may establish wireless communication links 103A with the communications network 142A via RF transceiver towers 104.

The portable computing device (PCD) 100 may support a token recognizer 105 that may comprise hardware and/or software that may reside in memory 404A (See FIG. 2C) of the PCD 102. The token recognizer 105 may work in combination with a camera 348 for scanning and retaining information from physical tokens 140.

The token recognizer 105 may comprise a central processing unit that may execute programs or it may have several dedicated circuits that include, but are not limited to, a broad recognizer module 110, an optical character recognition ("OCR") module 115, a bar code reader module 120, a validator module 125, a manual entry module 135, and temporary storage 130. The camera 348 may capture images of one or more physical tokens 140A, 140B such as, but not limited to, credit cards, gift cards, gasoline cards, stored value cards, telephone cards, and the like. These captured image images of the physical tokens 140 may be processed by the token recognizer 105.

Specifically, an image capture produced by the camera 348 may be first processed by the broad recognizer module 110. The broad recognizer module 110 may comprise one or more geometry-based mapping algorithms, or otherwise known to one of ordinary skill in the art, as computer vision technology which may be best used to determine the merchant or service provider who has issued a particular token 140. In other words, the broad recognizer module 110 may be designed to scan a captured image of the token 1404 geometries such as polygons or graphical logos, like trademarks, that are associated with a particular merchant and/or service provider. The broad recognizer module 110 may compare the shapes with geometries taken from the image capture of the physical token 140 and compare them to shapes or geometries that are maintained in a database, such as in the temporary storage 130, that provides a relationship between merchants/service providers and the shapes or geometries.

One advantage of the system 100 that employs the token recognizer 105 is that a user of the PCD 102 may distribute or layout a plurality of tokens 140 on a flat surface, such as a table, where each token 140 is positioned on its first side 142A, and then take an image containing the plurality of tokens 140 that displays their first sides 142A. Next, the user of the PCD 102 may flip each token 140 from its first side 142A to its second side 142B so that an image containing the second sides 142B of the tokens 140 may be generated with the camera 348.

Once the broad recognizer module one 110 has identified the merchant and/or service provider associated with the token 140, then the broad recognizer module 110 may pass this information to the OCR recognizer module 115 which then may perform a more detailed scan of the image capture produced by the camera 348. This detailed scan of the image capture by the OCR recognizer module 115 may be used to retrieve identification information from a token 140 that may include, but is not limited to, a card number, an account number, a machine-readable code associated with the account number, valid dates for the token 140, and a personal identification number, and the like.

With the broad recognizer module 110 identifying the merchant and/or service provider associated with the token 140, such information may help the OCR recognizer 115 to conduct detailed scans of the token image in regions of the image which are most likely to contain consumer specific information, such as, but not limited to, unique token identification information and/or account identification information based upon information about particular tokens 140 issued by merchants and/or service providers that is maintained within a database in temporary storage 130. In other words, the OCR recognizer module 115 may not be required to scan the entire image of a physical token 140 but instead only scan a portion of the image for a particular physical token 140 based on the information gathered/collected by the broad recognizer module 110.

In some instances, the broad recognizer module 110 may recognize enough information from a physical token that it may know the type of card out of a plurality of card types for a particular merchant or service provider. The broad recognizer module 110 may then instruct the OCR recognizer module 115 of the card type. The OCR recognizer module 115 may have access to a database of templates organized by a card types.

The detailed scan of the image capture by the OCR recognizer module 115 may be used to retrieve identification information from the token 140 that may include, but is not limited to, a card number, an account number, a machine readable code associated with the account number, valid dates for the token 140 and/or the account, and a personal identification number ("PIN").

Each token 140 may have a different shape and different types and/or locations of identification information which are governed and/or are dependent on the merchant/service provider issuing a particular token 110. The "broad" scan or high-level review by the broad recognizer module 110 may be particularly useful for tokens 140 that may have detailed information on both the front and back sides 142A, 142B of a particular token 140. If the broad recognizer module 110 determines the merchant and/or service provider associated with a token one 110 based on its read of the front side 142A of a token 140, then this information will help the OCR recognizer 115 to scan specific regions or areas of the rear side 142B of the token 140 that may be dependent upon the merchant and/or service provider who issued the token 140.

The OCR recognizer module 115 may retrieve text as well as machine-readable code information from its scan of a token image. Then it may pass this information to the machine code module 120 (i.e., a barcode reader) which can uncover the information contained within the machine-readable code.

The machine code module 120 and the OCR recognizer module 110 may pass the information that they retrieve to a validator module 125.

The validator module 125 may be provided with validation codes, checksums, and other data which are specific to the information associated with a particular merchant and/or service provider. If the validator module 125 detects errors in the information provided by the machine code 120 or the OCR recognizer module 115, then the message may be provided on the display 108 to the user of the PCD 102 that the token 110 scanned is not recognized by the PCD 102.

At this point, the PCD 102 via the token recognizer 105 may prompt the user to enter in the information displayed on the token 140 by utilizing the manual entry module 135. The manual entry module 135 may provide a user interface on the display 108 that is specific to tokens 140 of particular merchants and/or service providers if the broad recognizer module 110 is able to determine the merchant associated with the token 140 while the OCR recognizer module 115 is not able to scan and/or retrieve the information present on the token 140. The manual entry module 135 may also prompt the operator of the PCD 102 to review, correct, and/or re-enter information that was entered by the operator.

If the validator module 125 determines that the information retrieved by the OCR recognizer module 115 is accurate, then it may pass the information retrieved from the token 140 to the temporary storage 130. From the temporary storage 130, the information from the token 140 may be passed to the server 101 via the wireless communication network 142A or the information may be partly stored within a mobile wallet system 150, and particularly in a first database 160A of known tokens 140.

One goal of the token recognizer 105 is that it is designed to only retrieve the consumer information contained on the token 140 and not any other information that is directed to the source of the token 140, such as the merchant and/or service provider associated with the token 140. For tokens 140 which are known and supported by the mobile wallet system 150, the token recognizer 105 only retrieves consumer information from the token 140. This means that the token recognizer 105 for tokens 140 supported by the mobile wallet system 150 does not retrieve or store additional information such as color, artwork, graphical logos/icons, or trademarks present on the token 140 and associated with the source of the token 140, such as a merchant and/or service provider. This additional information, for tokens 140 supported by the mobile wallet system 150, is stored and maintained by the mobile wallet system 150 via the server 101 in the first database 160A. This means that when the token recognizer 105 transfers consumer information for a token 140 that is supported by the mobile wallet system 150 to the server 101 from a token 140, only consumer specific information from the token 140 is transferred.

For tokens 140 that are not supported by the mobile wallet system 150, that may be referred to as "unrecognized tokens," the token recognizer 105 can transfer consumer information from the token 140 as well as digital images that provide the color, artwork, graphical logos/icons, or trademarks present on the token 140. Once the mobile wallet system 150 supports a particular token 140, then this status is communicated to the token recognizer 105 so that additional non-consumer type information, such as color, artwork, graphical logos/icons, or trademarks present on the token 140, are not collected by the token recognizer 105.

In this way, the mobile wallet system 100 may reproduce digital images of physical tokens 140 and their corresponding identification information on command when a user of the PCD 102 desires to view the digital representation of the token 140 on the display 108 of the PCD 102. The operator of the PCD 102 may use the digital representation of the token 140 to conduct transactions such as purchasing goods at a point of sale ("POS") terminal in a merchant's store.

If the broad recognizer module 110 and the OCR recognizer module 151 are unable to determine a merchant and/or service provider associated with a particular token 140 (an "unsupported token"), then the image capture produced by the camera 348 may be passed to the temporary storage 130. At some point, the image capture of the token 140 is transmitted by the PCD 102 to the server 101 so that the image capture may be processed by a robust validator module 145.

The robust validator module 145 may comprise one or more complex algorithms, fingerprints, and/or profiles used to identify characteristics of images taken of tokens 140 so that merchants and/or service providers associated with particular tokens 140 may be identified/determined. The robust validator module 145 may also be coupled to an unsupported token matching logic module 155.

The unsupported token matching logic module 155 may maintain a second database 160B of tokens 140 that are not recognized ("database 165 of unknown tokens 140") by the system 100. As users of the system 100 continue to enter tokens 140 that may not be supported by the system 100 and usually, then the unsupported token matching logic module 155 may start grouping tokens 140 that are identical or substantially similar to one another.

Once these groupings are made by the matching logic 155 and a predetermined threshold is achieved for a particular group, such as on the order of twenty or more matches of the same type of token 140 as merely as an example, then the unsupported token matching logic module 155 may prompt an operator of the server to create a template for a particular token 140 based on the number of PCD users which have entered the same token 140 into the system 100.

According to an exemplary embodiment, the token matching logic module 155 may identify common features or characteristics of similar tokens. The token matching logic module 150 may develop account masks for certain tokens that are identified as similar by the logic module 150. The logic module 150 may start inferring common features of similar tokens and pre-populate standard fields for account masks. In some scenarios, the logic module 155 may create masks or templates that only require approval of an operator so that they may be used in the supported token database 160A. In this way, the server 101 automatically expands its database of supported tokens 160A, so that operators of the PCD 102 may start using digital representations of tokens 140 instead of using the actual physical tokens 140 themselves.

Figure 1B:
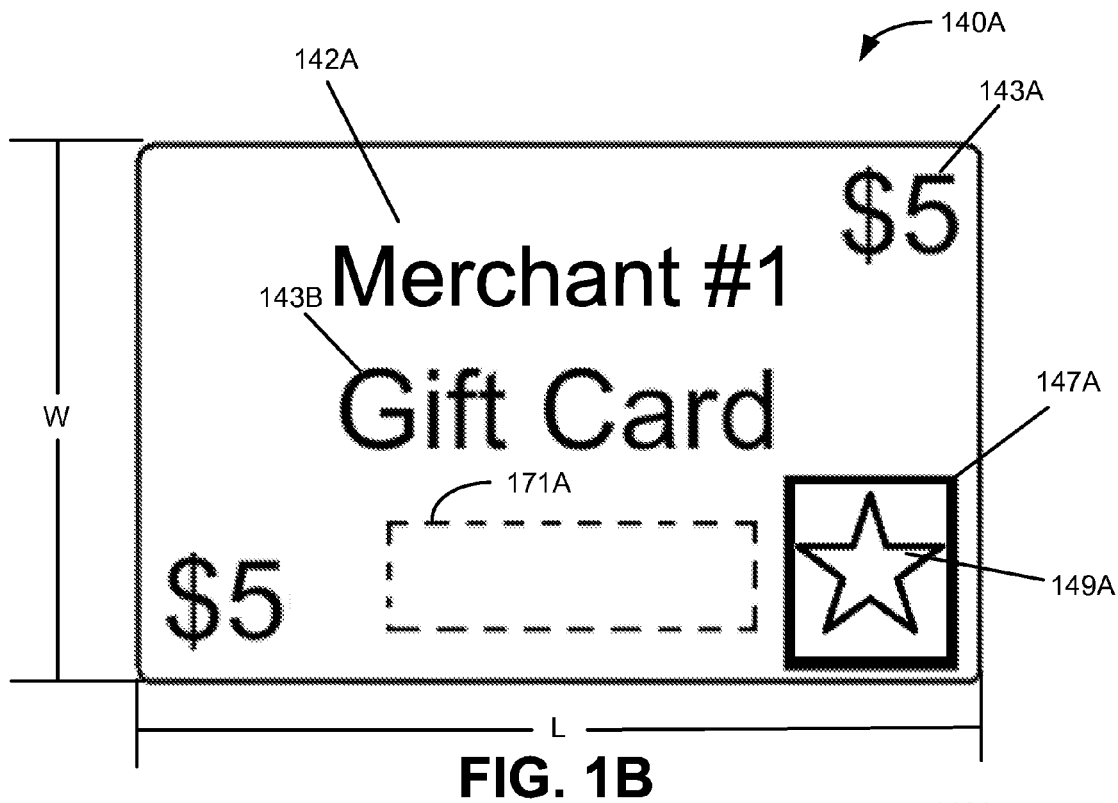
FIG. 1B is a view of a first side of an exemplary token.

FIG. 1B is a view of a first side 142A of an exemplary token 140A. The stored value token 140A may comprise a rectangular shape and can have a length L and a width W that generally correspond with the length and width of cards used in financial transactions. In other words, the length L and width W may have sizes corresponding with standard sized financial cards like debit cards, integrated circuit (IC) cards, and credit cards as used in industry. The length L and width W can correspond with Format ID-1 of the International Organization for Standardization (ISO) and the International Electrotechnical Commission (ISO/IEC) standard 7810. This means that the length L can comprise a magnitude of about eighty-five millimeters and the width W can comprise a magnitude of about fifty-four millimeters. Dimensions greater than or less than these exemplary magnitudes are within the scope of the invention.

As noted above, the inventive system 100 is not limited to scanning tokens 140 comprising cards with rectangular shapes. The inventive system 100 may scan and capture data from tokens 140 with other shapes, such as, but not limited to, square, circular, pentagonal, elliptical, octagonal, and other shapes. The system 100 is also not limited to the token 140 illustrated in FIGS. 1B-1C. Other tokens 140 which are not cards are included within the scope of the invention. The token 140 can comprise any type of object which may be able to support or bear token information that may include, but is not limited to, graphical logos 147.

The exemplary card token 140A illustrated in FIG. 1B can be made from one or more various materials. For example, the card token 140A may be made from materials such as, but not limited to, paper, cardboard, plastic, metal, and other similar materials. On a first side 142A, the card token 140A may comprise human-readable media 143. The human-readable media 143 may comprise a value 143A assigned to the card token 140A. In the exemplary embodiment of FIG. 1B, the value 143A comprises five U.S. dollars. However, other magnitudes for the value 143A as well as other currencies may be used without departing from the scope of the invention. The human-readable media 143 may further comprise text 143B which can identify that the token 140A is a form of a financial instrument, such as a gift card. The text 143B can take on any form and can provide any type of information desired by the manufacturer or originator of the token 140A.

A graphical logo 147 present on the first side 142A of the token 140A can comprise an outer square box 147A that encloses or circumscribes an inner member 149A. The inner member 149A in the exemplary embodiment illustrated in FIG. 1B comprises a five-pointed star. Other geometric shapes that may comprise a source's brand, such as a trademark, are included within the scope of the invention.

The inner member 149A is not limited to shapes and can comprise other elements in addition to or instead of the shapes. The other elements for the inner member 149A can include, but are not limited to, graphical characters, shapes, symbols, and other similar elements.

The outer member 147A is not limited to a square box. Other shapes are possible and are within the scope of the invention. For example, other shapes include, but are not limited to, rectangular, circular, pentagonal, elliptical, octagonal, and other shapes. The token 140A may further comprise machine-readable media 171A which has been illustrated with dashed lines to denote that it is hidden from the view illustrated in FIG. 1B. Further details of the machine-readable media 171B are illustrated in FIG. 1C and discussed in further detail below.

Figure 1C:
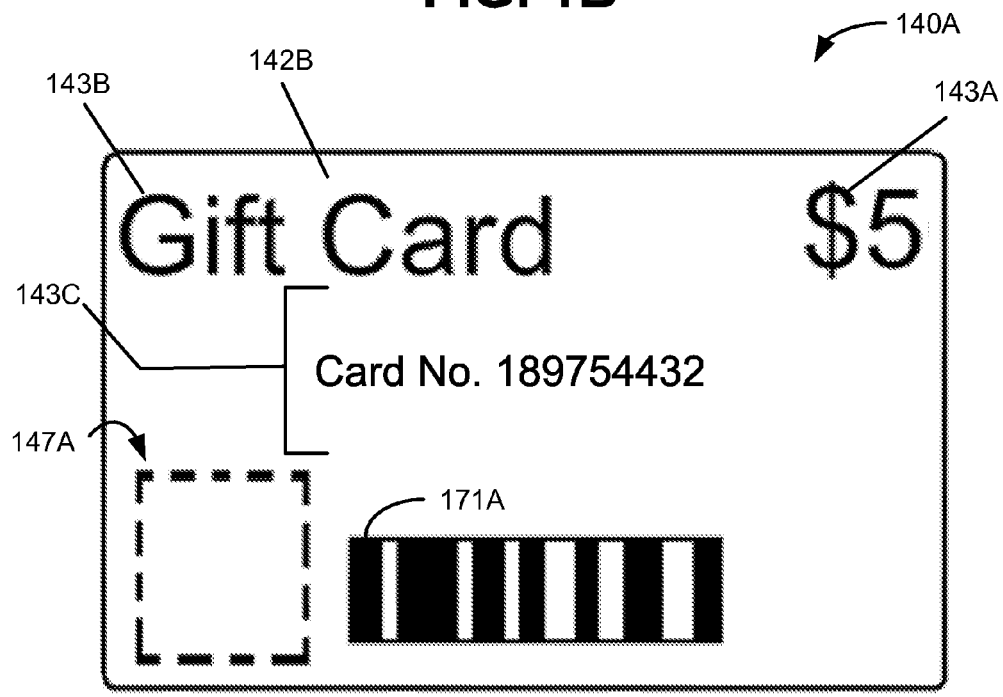
FIG. 1C is a view of a second side of an exemplary token.

FIG. 1C is a view of a second side 142B of the exemplary stored value token 140A of FIG. 1B according to an exemplary embodiment of the invention. On this second side 142B of the stored value token 140A, both human-readable media 143C and machine-readable media 171A may be present. However, it is within the scope of the invention for this second side 142B to display only machine-readable media 171A. The human-readable media 143C on the second side 142B can comprise text 143C that includes a unique token identifier.

In the exemplary embodiment illustrated in FIG. 1C, the machine-readable media 171A comprises a bar code. The token 140A is not limited to the machine-readable media 171A illustrated in FIG. 1C. The machine-readable media 171A can comprise one or more different forms. For example, the machine-readable code 171A can comprise a magnetic stripe, an integrated circuit chip, a radio-frequency antenna, and other similar machine-readable elements. The machine-readable media 171A can communicate a code and/or the actual value of the token 140A to a reader of the PCD 102 so that the value associated with the token 140A can be ascertained by PCD 102. The graphical logo 147A has been illustrated with dashed lines on the second side 142B of the token 140A to denote that it is hidden from the view illustrated in FIG. 1C.

The marker 147A, the human-readable media 143, and machine-readable media 171A may be formed from ink or other marking media. These elements can be directly applied to their respective sides 142A, 142B of the token 140A or they may be applied to a substrate that is attached to respective sides 142 of the token 140A with an adhesive.

Figure 1D:
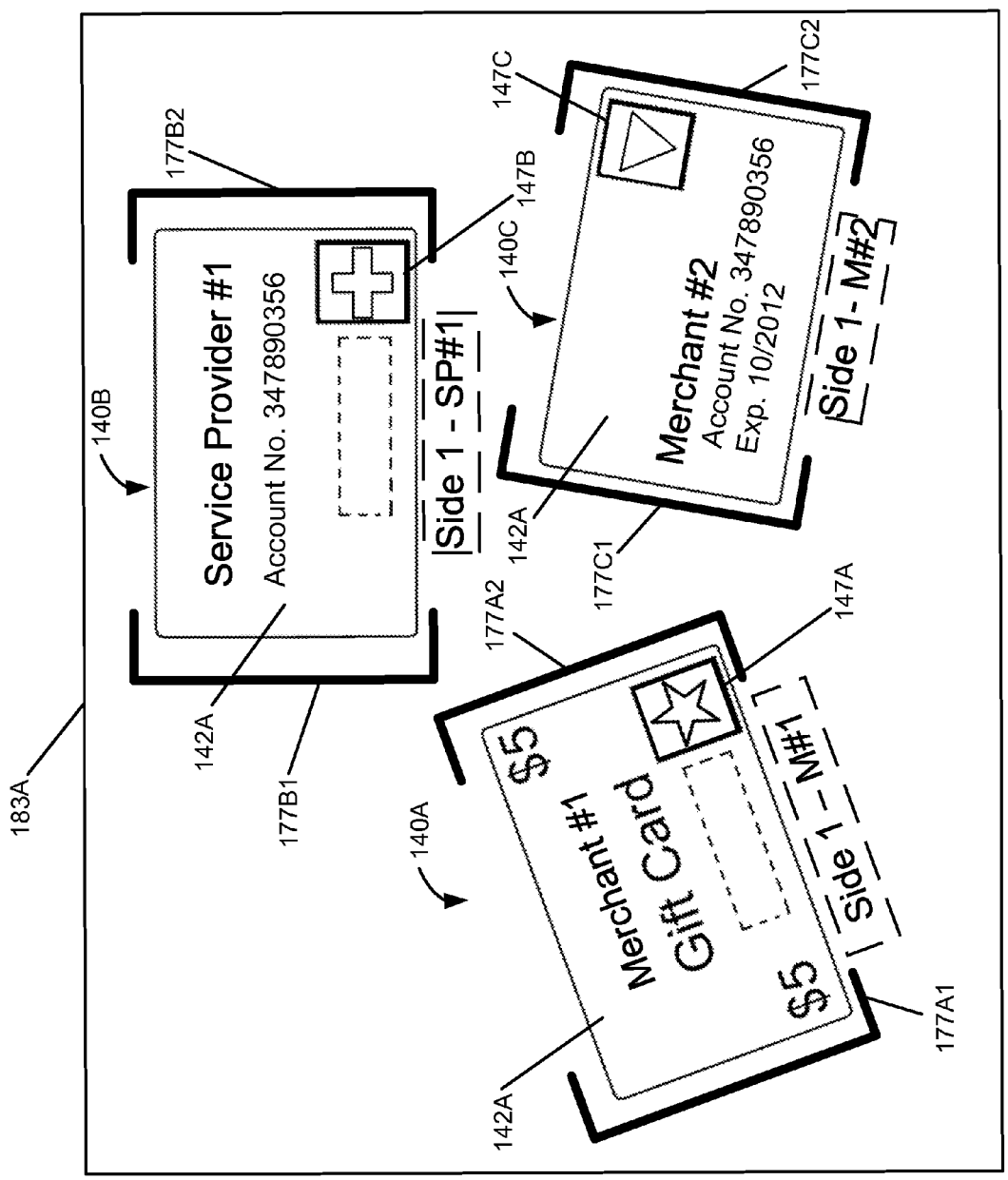
FIG. 1D is an exemplary first image capture comprising a plurality of tokens that are positioned such that a first side of each token is viewable by the camera of the PCD.

FIG. 1D is an exemplary first image capture 183A comprising a plurality of tokens 147 that are positioned such that a first side 142A of each token is viewable by the camera 348 of the PCD 102. The broad recognizer module 110 may generate one or more scan bars or geometries 177 that highlight or outline the borders or edges of each token contained within the image capture 183A. Once the broad recognizer module 110 generates the one or more scan bars 177, then it may conduct its broad scan of the token 147 positioned within the scan bars 177. The broad recognizer module 110 may be designed to look for larger or significant objects such as graphical logos or icons 147 and/or colors that are normally present on a first side 142 of the token 147. Once the broad recognizer module 110 is able to associate graphical logos or icons 147 and/or colors with a particular merchant and/or service provider, then it send merchant or service provider-specific field information that will allow the OCR recognizer module 1152 only scan certain portions of the image capture 183A contained within a set of respective scan bars 177.

For example, in scanning the first token 140A of the image capture 183A, the broad recognizer module 110 may recognize the star within a box graphical icon/logo 147A has been associated with a particular merchant, such as Merchant #1. The broad recognizer module 110 may access a database contained within the temporary storage 130 to determine the specific scanning parameters that should be passed to the OCR recognizer module 115 which are associated with Merchant #1. In the example illustrated in FIG. 1D., the broad recognizer module 110 may discover from the database that the Merchant #1 lists the card type information for token within a central region of the first side 142A of the token 140A. The broad recognizer module 110 may pass this information to the OCR recognizer module 115 so that the OCR recognizer module 115 only scan the central region of the first token 140A which contains the card type which in this case is a "Gift Card."

Figure 1E:
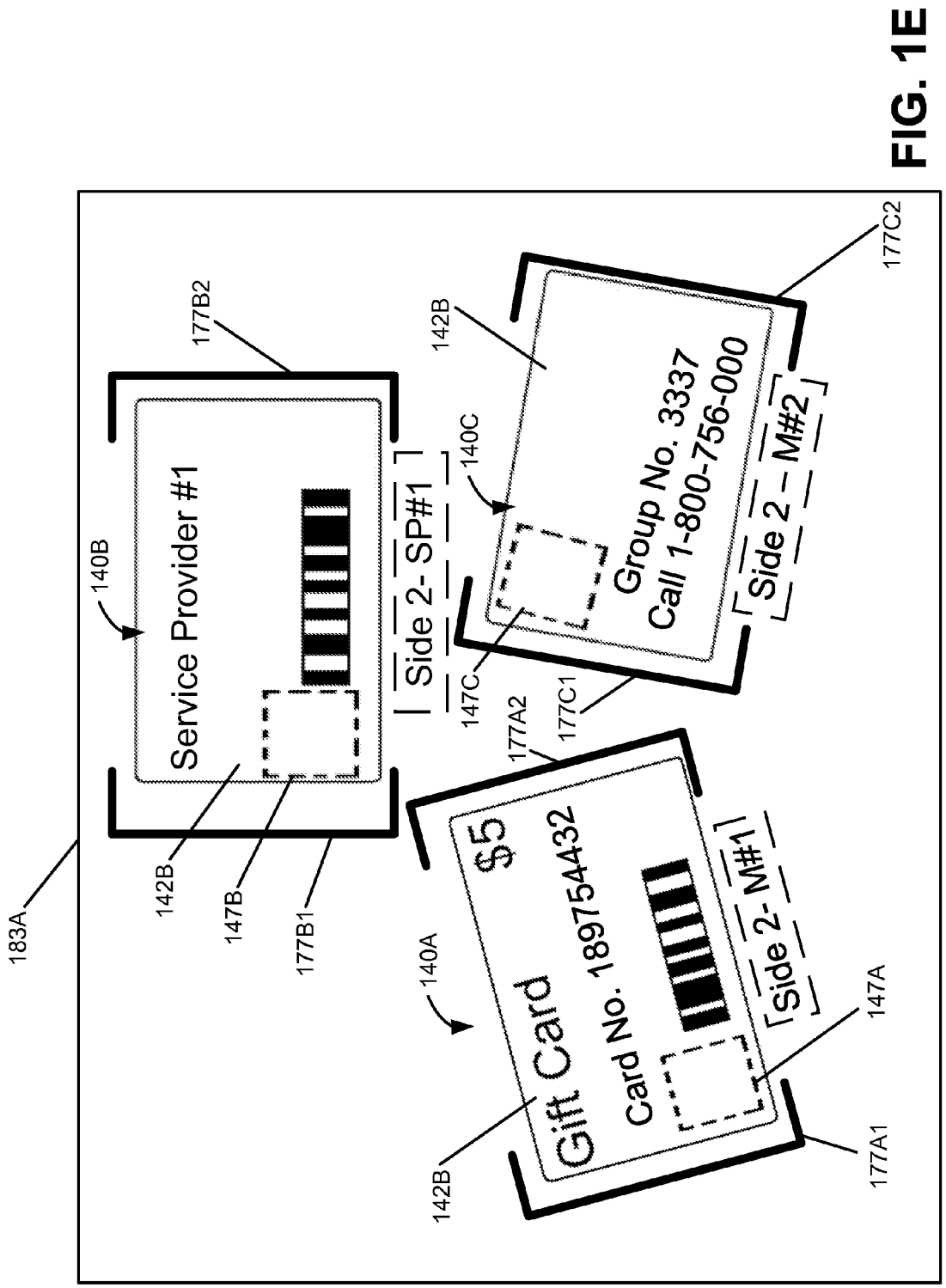
FIG. 1E is an exemplary second image capture comprising a plurality of tokens that are positioned such that a second side of each token is viewable by the camera of the PCD.

FIG. 1E is an exemplary second image capture 183B comprising a plurality of tokens 147 that are positioned such that a second side 142B of each token is viewable by the camera 348 of the PCD 102. The broad recognizer module 110 may generate one or more scan bars 177 that highlight or outline the borders or edges of each token contained within the image capture 183A. Next, depending upon the information discovered by the broad recognizer 110 during its scan of the first image capture 183A, the broad recognizer module 110 may pass control directly to the OCR recognizer module 115 or it may conduct another scan of each token 140. For example, if the broad recognizer module 110 did not recognize the merchant and/or service provider associated with a particular token 140, the broad recognizer module 110 may conduct another scan of the second image 183B to determine if it can recognize the merchant and/or service provider associated with a particular token 140.

If the broad recognizer module 110 discovers the merchant and/or service provider associated with the token 140 based on its scan of the first image capture 183A, then after the broad recognizer module 110 produces the scan bars 177 in the second image capture 183B, then the module 110 may transfer direct control of the scanning process over to the OCR recognizer module 115. Based on the information it receives from the broad recognizer module 110, the OCR recognizer module 115 may conduct a very focused scan of the second image capture 183B that is contained within each of the respective scan bars 177 which were produced by the broad recognizer module 110. This focused scan conducted by the OCR recognizer module 115 usually and generally comprises a much smaller area than that contained between the scan bars 177 of the second image capture 183B. Based on this focused scan, the OCR recognizer module 115 may capture consumer information present on the second side 142B of the token 140 that may include, but is not limited to, account number, validates, machine-readable codes such as a point-of-sale barcode, a card number, and a personal identification number ("PIN").

Figure 1F:
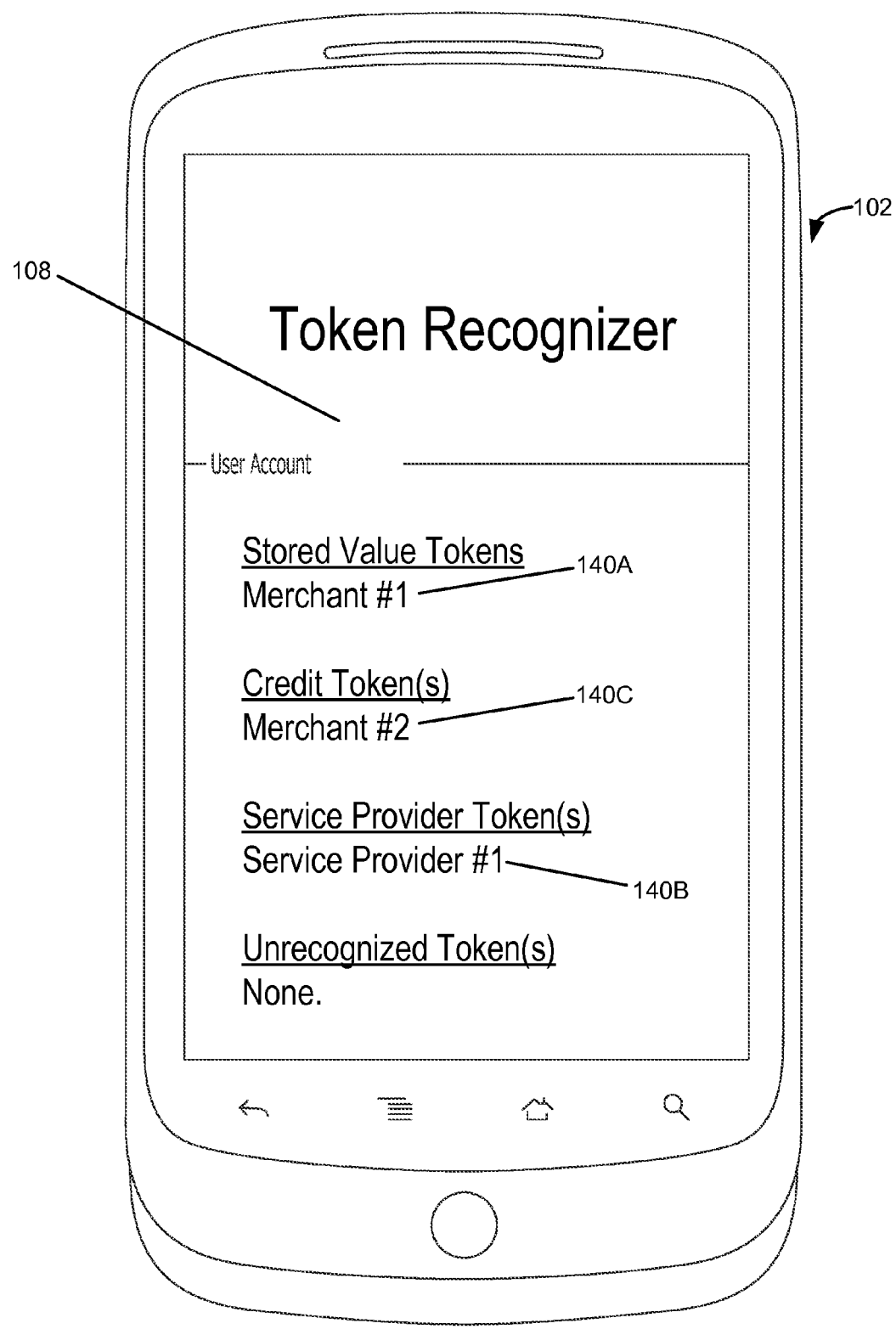
FIG. 1F is an illustration of exemplary display screen of a PCD which provides a user interface that lists the tokens that may be recognized by the system and tokens which may not be recognized by system.

FIG. 1F is an illustration of exemplary display screen 108 of a PCD 102 which provides a user interface that lists the tokens 140 that may be recognized by the system 100 and tokens which may not be recognized by system 100. This user interface may be managed by the manual entry module 135 once generated so that an operator of the PCD 102 may enter consumer information manually if such information is not recognized by the broad recognizer module 110 and/or OCR recognizer module 115.

Figure 2A:
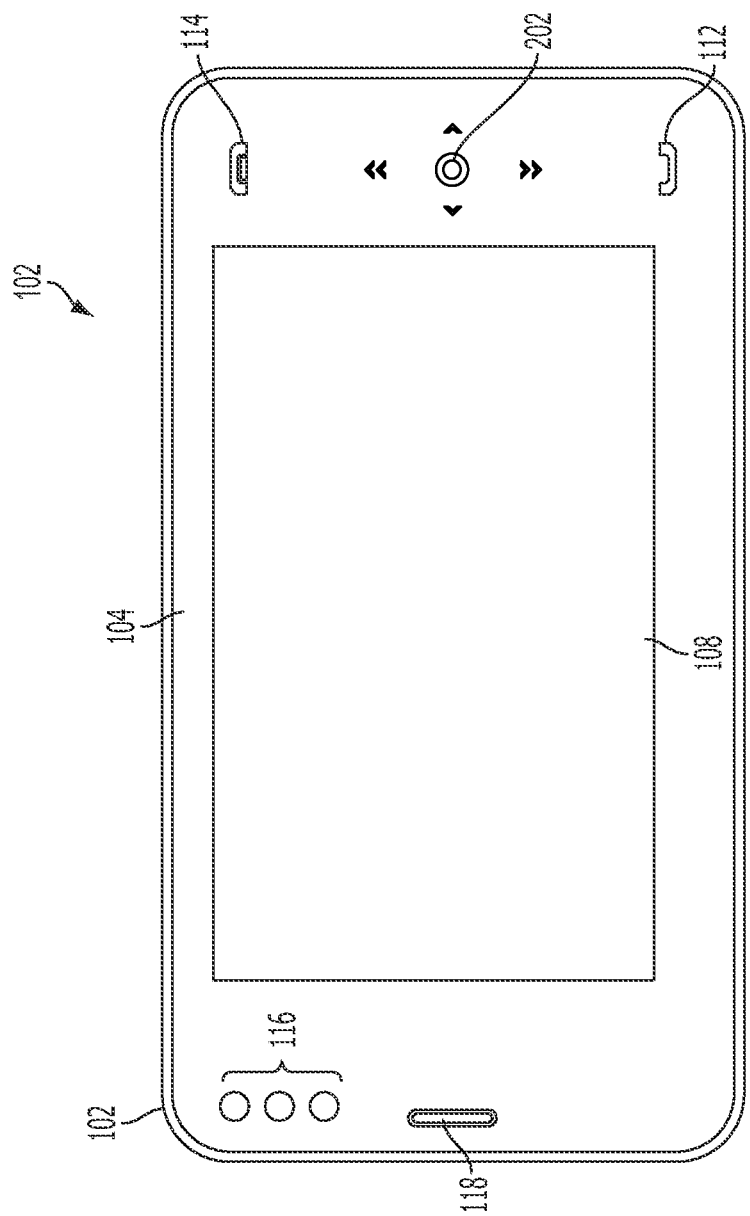
FIG. 2A is a front plan view of a first aspect of a portable computing device (PCD) in a closed position.

Referring to FIG. 2A and FIG. 2B, an exemplary portable computing device (PCD) 102 is shown. As shown, the PCD 102 may include a housing 104, 106. The housing 103 may include an upper housing portion 104 and a lower housing portion 106. FIG. 2A shows that the upper housing portion 104 may include a display 108. In a particular aspect, the display 108 may be a touch screen display. The upper housing portion 104 may also include a trackball input device 202. Further, as shown in FIG. 2A, the upper housing portion 104 may include a power on button 112 and a power off button 114. As shown in FIG. 2A, the upper housing portion 104 of the PCD 102 may include a plurality of indicator lights 116 and a speaker 118. Each indicator light 116 may be a light emitting diode (LED).

In a particular aspect, as depicted in FIG. 2B, the upper housing portion 104 is movable relative to the lower housing portion 106. Specifically, the upper housing portion 104 may be slidable relative to the lower housing portion 106. As shown in FIG. 2B, the lower housing portion 106 may include a multi-button keyboard 204. In a particular aspect, the multi-button keyboard 204 may be a standard QWERTY keyboard. The multi-button keyboard 204 may be revealed when the upper housing portion 104 is moved relative to the lower housing portion 106. FIG. 2B further illustrates that the PCD 102 may include a reset button 122 on the lower housing portion 106.

Figure 2C:
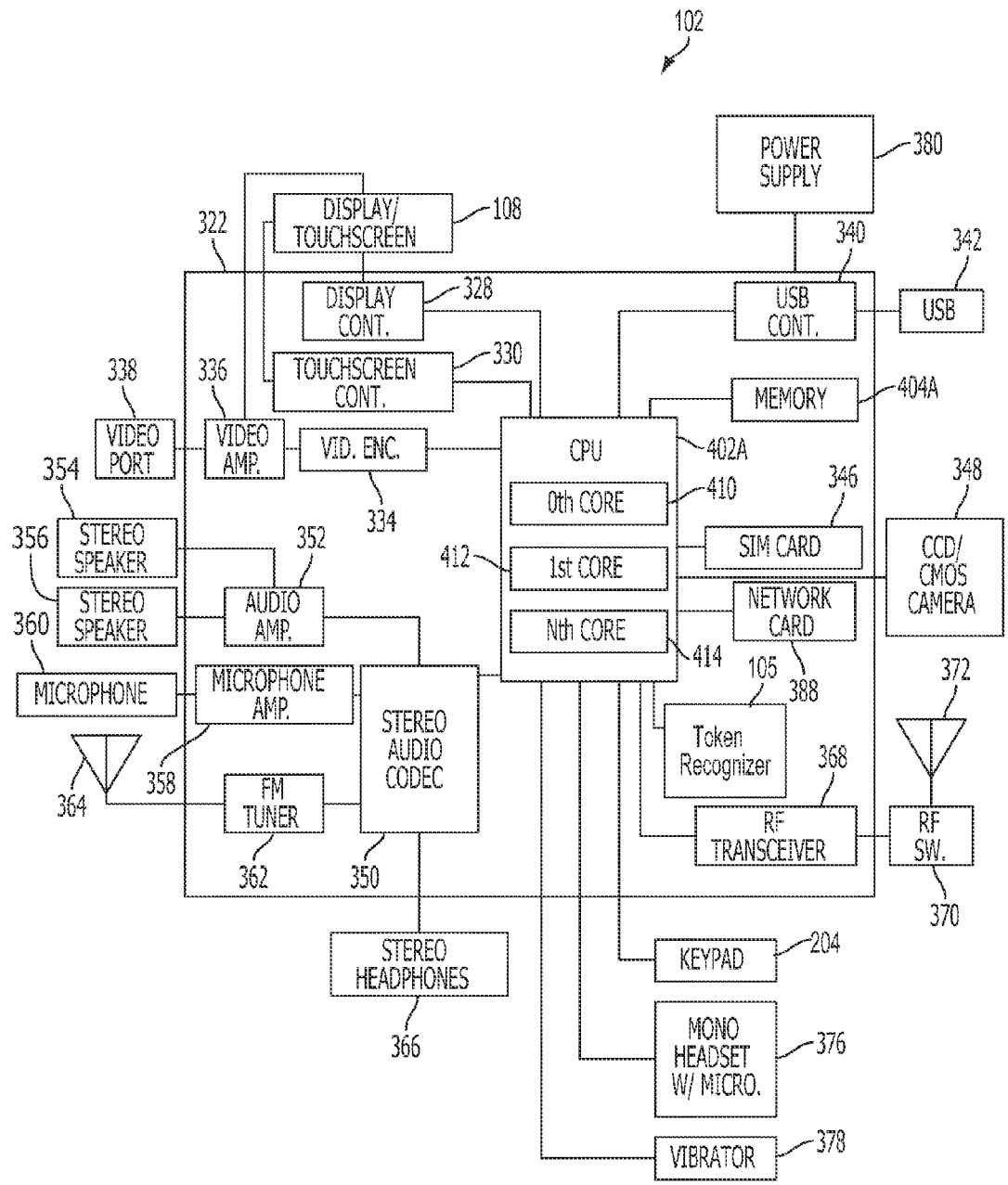
FIG. 2C is a block diagram of a second aspect of a PCD.

Referring to FIG. 2C, an exemplary, non-limiting aspect of a portable computing device (PCD) is shown and is generally designated 102. As shown, the PCD 102 includes an on-chip system 322 that includes a multicore CPU 402A. The multicore CPU 402A may include a zeroth core 410, a first core 412, and an Nth core 414. According to alternate exemplary embodiments, the CPU 402 may also comprise those of single core types and not one which has multiple cores.

As illustrated in FIG. 2C, a display controller 328 and a touch screen controller 330 are coupled to the multicore CPU 402A. In turn, the touch screen display 108 external to the on-chip system 322 is coupled to the display controller 328 and the touch screen controller 330.

FIG. 2C further shows that a video encoder 334, e.g., a phase alternating line (PAL) encoder, a sequential color a memoire (SECAM) encoder, or a national television system (s) committee (NTSC) encoder, is coupled to the multicore CPU 402A. Further, a video amplifier 336 is coupled to the video encoder 334 and the touch screen display 108. Also, a video port 338 is coupled to the video amplifier 336. As shown in FIG. 2C, a universal serial bus (USB) controller 340 is coupled to the multicore CPU 402A. Also, a USB port 342 is coupled to the USB controller 340. Memory 404A and a subscriber identity module (SIM) card 346 may also be coupled to the multicore CPU 402A.

Further, as shown in FIG. 2C, a digital camera 348 may be coupled to the multicore CPU 402A. In an exemplary aspect, the digital camera 348 is a charge-coupled device (CCD) camera or a complementary metal-oxide semiconductor (CMOS) camera.

As further illustrated in FIG. 2C, a stereo audio coder-decoder (CODEC) 350 may be coupled to the multicore CPU 402A. Moreover, an audio amplifier 352 may coupled to the stereo audio CODEC 350. In an exemplary aspect, a first stereo speaker 354 and a second stereo speaker 356 are coupled to the audio amplifier 352. FIG. 2C shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 2C further illustrates that a radio frequency (RF) transceiver 368 may be coupled to the multicore CPU 402A. An RF switch 370 may be coupled to the RF transceiver 368 and an RF antenna 372. As shown in FIG. 2C, a keypad 204 may be coupled to the multicore CPU 402A. Also, a mono headset with a microphone 376 may be coupled to the multicore CPU 402A. Further, a vibrator device 378 may be coupled to the multicore CPU 402A.

FIG. 2C also shows that a power supply 380 may be coupled to the on-chip system 322. In a particular aspect, the power supply 380 is a direct current (DC) power supply that provides power to the various components of the PCD 102 that require power. Further, in a particular aspect, the power supply is a rechargeable DC battery or a DC power supply that is derived from an alternating current (AC) to DC transformer that is connected to an AC power source.

FIG. 2C further indicates that the PCD 102 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

The multicore CPU 402A may be coupled to software and/or hardware embodiments of a token recognizer 105 which is described above in connection with FIG. 1A. The token recognizer 105 which works in concert with the camera 348 may take the form of software and/or hardware, such as, but not limited to an application integrated circuit (ASIC), and/or firmware. The token recognizer 105 is generally responsible for capturing information from tokens 147 that are carried on a person and converting them to a digital domain.

As depicted in FIG. 2C, the touch screen display 108, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 404A as computer program instructions, such as the modules described above in connection with the token recognizer 105 as illustrated in FIG. 1.

These instructions may be executed by the multicore CPU 402A in combination or in concert with the token recognizer 105 to perform the methods described herein. Further, the multicore CPU 402A, token recognizer 105, and memory 404A of the PCD 102, or a combination thereof may serve as a means for executing one or more of the method steps described herein.

Figure 2D:
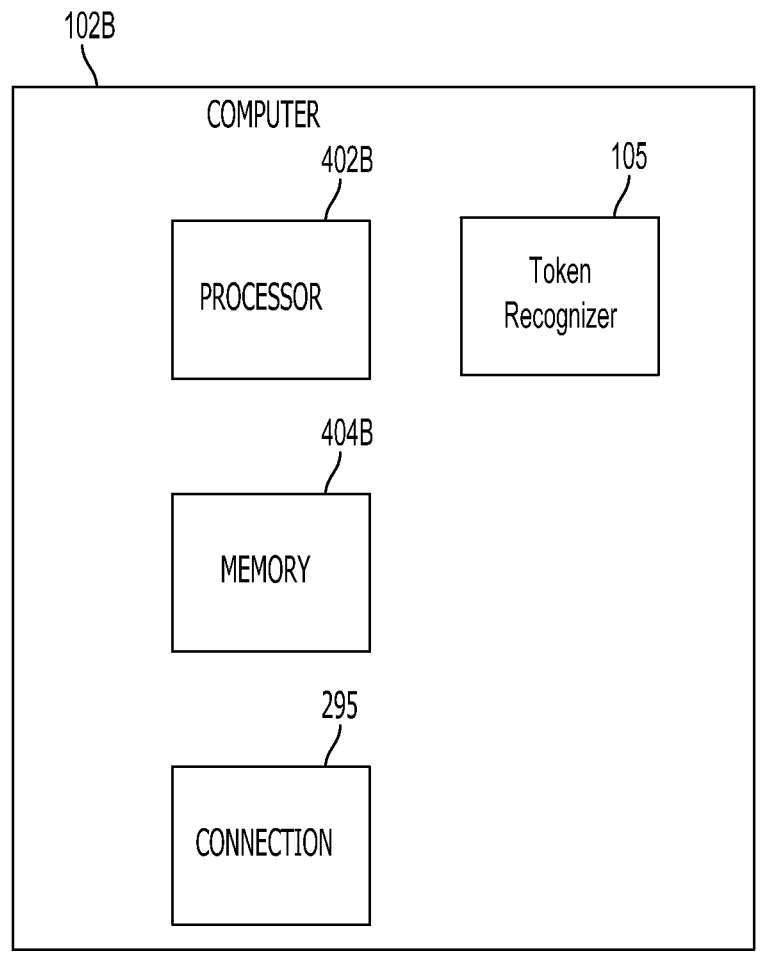
FIG. 2D is a block diagram of a general purpose computer that may embody a PCD.

Turning to FIG. 2D, this figure is a block diagram of a general purpose computer 102B that may embody a PCD 102B. The computer 102B may have a processor 402B, a memory 404B, and a connection 295. The processor 402B may be configured by software instructions to perform a variety of methods, including the methods of the various embodiments described herein. For example, the processor 402B may comprise a general purpose processor (e.g., x86, ARM, etc.), a digital signal processor ("DSP"), an application specific integrated circuit ("ASIC"), a field programmable gate array ("FPGA"), etc.

The processor 402B may be coupled to the token recognizer 105, which is described above. The token recognizer 105 may take the form of software and/or hardware, such as, but not limited to an application integrated circuit (ASIC), and/or firmware. The token recognizer 105 is generally responsible for capturing information from tokens 147 that are carried on a person and converting them to a digital domain.

The memory 404B may be any optical disk storage, any magnetic disk storage, or any other medium operable to store logic and/or data accessible by the computer 890. The memory 404B may comprise random access memory ("RAM"), read-only memory ("ROM"), electrically erasable programmable read-only memory ("EEPROM"), compact-disc read-only memory ("CD-ROM"), digital video disc read-only memory ("DVD ROM"), solid-state memory, etc.

The connection 295 may generally allow connectivity to other computers, wireless devices, laptops, servers, etc. The connection 295 may comprise a network interface card ("NIC"), a modem, a universal serial bus port ("USB"), a Firewire port, a 3G/4G wireless modem, a near-field communication connection ("NFC"), etc. The connection 295 may be any other wired connection, any other wireless connection, any other magnetic connection, any other visual connection, any other audible connection, etc.

Figures 3, 4, 5:
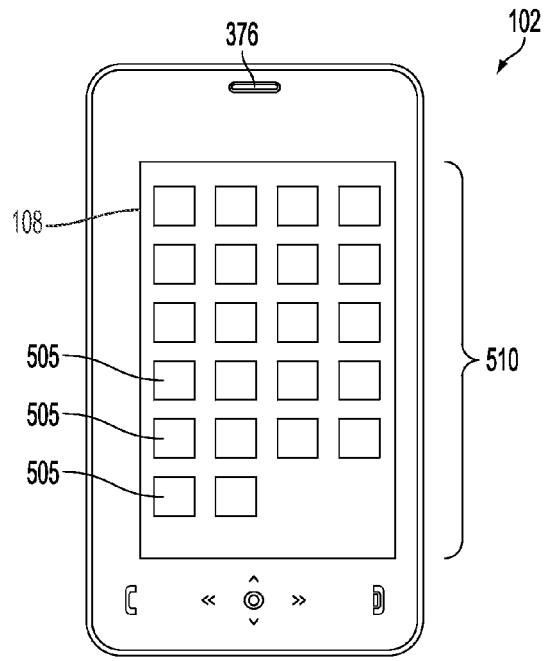
FIG. 3 is a diagram of an exemplary touch screen display for a PCD.
FIG. 4 is a diagram of a screen for displaying a listing of balances for accounts corresponding to tokens that have been processed and stored by the token recognizer and which are available to a user of a PCD.
FIG. 5 is a diagram of a screen for displaying an exemplary redemption presentation of a digital token to a user of a PCD.

FIG. 3 is a diagram of a touch screen display 108 for a PCD 102. As shown, the PCD 102 may include a menu or listing 510 of program icons 505. The PCD 102 also includes a headset or speaker 376 that may be positioned next to a user's ear for listening to a mobile phone conversation.

FIG. 4 is a diagram of a screen 2100 for displaying a listing 2002A of balances for accounts corresponding to tokens 147 that have been processed and stored by the token recognizer 105 and which are available to a user of a PCD 102. Screen 2100 can display account balances for any type of account such as banking accounts, fuel accounts, gift cards, stored value accounts, and loyalty cards. In the exemplary embodiment illustrated in FIG. 4, a gift card or stored value account balance option 2002 has been selected by the user of the client device 120. In response to this selection, the PCD 102 may display the listing 2002A of stored value accounts that may be accessed with the PCD 102. The listing 2002A of stored valued accounts may comprise various icons that represent the different merchants 120 associated with the stored value account.

FIG. 5 is a diagram of a screen 2200 for displaying an exemplary redemption presentation of a digital token to a user of a PCD 102. Screen 2200 may display an icon representing a merchant 120C and a bar code, such as a two-dimensional bar code 804A. Screen 2200 may also display other human readable card information 2202 that may include, but is not limited to, and available balance of the stored value account, a card number associated with the stored value account, and a personal identification number ("PIN") associated with the stored value account. This human readable card information 2202 was captured, processed, and stored by the token recognizer 105.

Figure 6A:
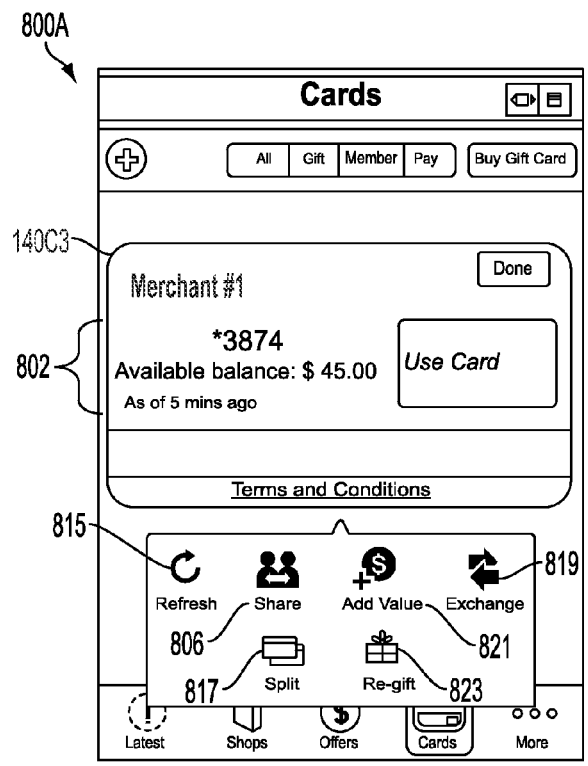
FIG. 6A is a diagram of a screen that lists options for managing an account previously associated with a token but now captured and displayable on the PCD 102 via the token recognizer.

Referring to FIG. 6A, this is a diagram of a screen 800A that lists options for managing an account previously associated with a token 140 but now captured and displayable on the PCD 102 via the token recognizer 105. The options screen 800A may comprise virtual or digital token 140C3 having a listing of account information 802 associated with account such as the name of the merchant "Merchant #1", the last four digits of a multi-digit digit Personal Account Number (PAN) 165, a current value, and a graphical representation of a magnetic stripe so that the user of the PCD 102 recognizes that possible use of the virtual token 140C3.

The options screen 800A may further comprise icons that are associated with different options for managing the stored value account. Such icons may be illustrated with symbols to suggest their intended functions. Such icons may be associated with, but are not limited to, the following functions/operations: refresh 815, a share function 806, a split function 817, an add value operation 821, an exchange operation 819, and a re-gift operation 823.

If the share card icon 806 is selected by a user, then the user of the PCD 102 may send a portion or all of the value associated with an account to another recipient device or PCD 102. Activating this icon or button 806 may initiate another user interface that instructs the user how the value associated with an account corresponding to the digital token 140C3 may be shared with another recipient PCD 102B, especially if the account is a stored value account or gift card. The recipient of a shared account may have reduced functionality for using the account. The shared account recipient may be restricted to the following actions: viewing the current available balance of the account; and presenting the shared account at a merchant point-of-sale ("POS") device.

Generally, a recipient of the shared account will not be able to distribute the shared account to others; exchange the account to another merchant brand; or add value to the account. If the owner of the account exchanges the brand associated with the account, then a mobile wallet system 150 may notify and revoke the sharing privileges with those participants who are currently sharing the account with the owner.

The mobile wallet system 150 may send a notification to the owner of an account for purchases made by a shared account recipient with a shared version of the account. This notification may include the time of purchase, date of the purchase, the city and state of the merchant location, and the purchase amount. Purchases made by the owner will generally not be provided to any of the shared account recipients. Further, purchases made by shared account recipients will usually not be provided to other shared account recipients of the stored value account. Further, any personalizations associated with the account will generally only be provided to the intended recipient PCD 102B. The personalizations will usually not be provided to any shared account recipients of the stored value account. Instead, the shared account recipient may receive a generic virtual token 147 that does not have any personalized element.

If the refresh icon 815 is selected by a user, then the activation of this icon may allow the screen 800A to refresh itself so that a current balance of the virtual token 147 is displayed and the account information 802. As noted previously, if the account associated with the virtual token 702 is being shared, then other users may be making purchases or withdrawals relative to the account. In such circumstances of simultaneous use of the same account, the current account balance becomes very relevant to a user who is about to purchase a good or service using the virtual token 140C3 and corresponding stored value account managed by the mobile wallet system 150.

The split icon 817 when selected may activate an operation that allows the user of the recipient client device to split the funds associated with a single PAN 165 so that two sets of the total value of the funds are now associated with two PANs 165. In essence, this split function allows the user of the recipient PCD 102 to create two virtual tokens 147 having two values based on single virtual token 147 that had an original value.

The exchange icon 819 allows a user of the PCD 102 to exchange value associated with one merchant for value with another merchant. The re-gift icon 823 allows a user of a PCD 102 to send an account to another recipient PCD 102B. Other options for managing an account, though not specifically illustrated, are within the scope of the invention as understood by one of ordinary skill in the art.

Figure 6B:
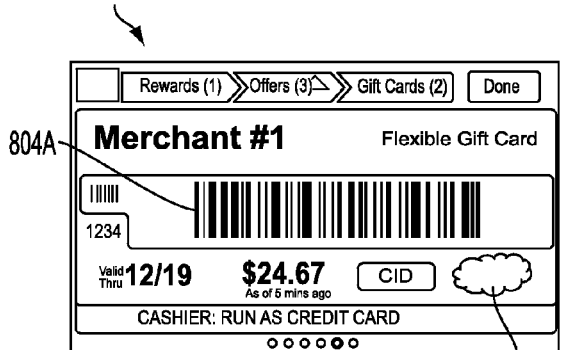
FIG. 6B is a diagram of a first detailed purchase/redemption presentation screen comprising scanned elements from a token for a transaction, such as, but not limited to, a stored value transaction.

FIG. 6B is a diagram of a first detailed purchase/redemption presentation screen 800B comprising scanned elements from a token 147 for a transaction, such as, but not limited to, a stored value transaction. This screen 800B may be generated in response to a user of the PCD 102 selecting the "use card" button listed on the virtual token 140C3 of FIG. 8A. A merchant may use a scanner to enter a one-dimensional bar-code 804A. Exemplary one-dimensional bar codes may include, but are not limited to, U.P.C., Codabar, Code 25—Non-interleaved 2 of 5, Code 25—Interleaved 2 of 5, Code 39, Code 93, Code 128, Code 128A, Code 128B, Code 128C, Code 11, CPC Binary, DUN 14, EAN 2, EAN 5, EAN 8, EAN 13, Facing Identification Mark, GS1-128 (formerly known as UCC/EAN-128), GS1 DataBar formerly Reduced Space Symbology ("RSS"), HIBC (HIBCC Bar Code Standard), ITF-14, Latent image bar code, Pharmacode, Plessey, PLANET, POSTNET, Intelligent Mail Bar code, MSI, PostBar, RM4SCC/KIX, JAN, and Telepen.

The current value of the account associated with the digital token 140C3 may be retrieved by the PCD 102 immediately prior to the display of the account information and the barcode 804A to insure it is accurate as possible at the time of sale. The amount of time for the PCD 102 to retrieve the current value of the stored value account 142 may be approximately under five seconds, depending on network availability and other factors. If a delay is experienced, such as on the order of greater than ten seconds, then the last cached balance along with an "as of" date stamp may be displayed by the PCD 102.

Screen 800B may be displayed when a user of the recipient PCD 102 desires to redeem n account 142 for purchasing goods or services at a point of sale ("POS") terminal in a store or if the user wishes to purchase goods and/or services over a telephone network. Screen 800B may also comprise a "watermarked" background 808 that is displayed behind or adjacent the two-dimensional barcode 804. This "watermarked" background 808 may contain an image that has a pattern which may be difficult to reproduce and may be human-readable, such as by a cashier who may check the detailed purchase screen 800 for authenticity. Screen 800B may include the ability to present multiple virtual tokens associated with the same merchant. These virtual tokens 147 may be associated with other accounts, external account information, including loyalty, membership or reward accounts, merchant stored value accounts, or product discount certificates. Each of these virtual tokens 147 may be displayed separately upon selection by a user.

Information on the detailed purchase screen 800B is usually presented in a clear, high-contrast manner so that it is easily readable by a cashier at a standard distance, such as a distance of approximately thirty-six inches, preferably in a manner consistent with how a traditional physical token, like a credit card number, is typically displayed to a cashier.

Figure 6C:
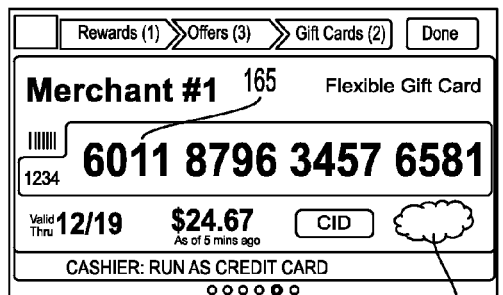
FIG. 6C is a second diagram of a detailed purchase/redemption presentation screen comprising scanned elements from a token for a transaction, such as, but not limited to, a stored value transaction.

FIG. 6C is a second diagram of a detailed purchase/redemption presentation screen 800C comprising scanned elements from a token 147 for a transaction, such as, but not limited to, a stored value transaction. This detailed purchase screen 800B is generally a human-readable display of stored value account information that may be used by a cashier to manually enter into a point-of-sale terminal to submit for authorization or for a user to enter into a website for an on-line purchase over the Internet. A merchant may key-in the account information, such as the PAN 165.

Figure 6D:
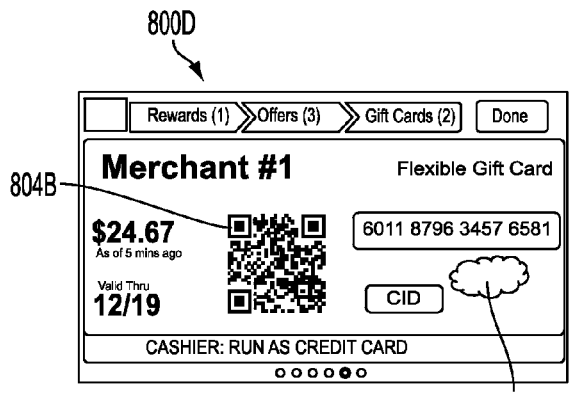
FIG. 6D is a third diagram of a detailed purchase/redemption presentation screen comprising scanned elements from a token for a transaction, such as, but not limited to, a stored value transaction.

FIG. 6D is a third diagram of a detailed purchase/redemption presentation screen 800D comprising scanned elements from a token 147 for a transaction, such as, but not limited to, a stored value transaction. This diagram is similar to FIG. 6B, however, instead of a one-dimensional bar code being displayed, a two-dimensional barcode 804B is displayed for a POS terminal that may scan such a barcodes 804B. The 2-D bar code may include, but is not limited to, the following symbologies: Aztec Code, 3-DI, ArrayTag, Small Aztec Code, Chromatic Alphabet, Chromocode, Codablock, Code 1, Code 16K, Code 49, ColorCode, Compact Matrix Code, CP Code, CyberCode, d-touch, DataGlyphs, Datamatrix, Datastrip Code, Dot Code A, EZcode, Grid Matrix Code, High Capacity Color Bar code, HueCode, INTACTA.CODE, InterCode, MaxiCode, mCode, MiniCode, Micro PDF417, MMCC, Nintendo e-Reader#Dot code, Optar, PaperDisk, PDF417, PDMark, QR Code, QuickMark Code, Semacode, SmartCode, Snowflake Code, ShotCode, SuperCode, Trillcode, UltraCode, UnisCode, VeriCode, VSCode, WaterCode, for example.

If the recipient PCD 102 is being used for an e-commerce transaction, then the sixteen digit PAN 165 may be presented on the display device 108 in such a way so as to allow copying of the sixteen digit PAN 165 into an e-commerce website. The recipient PCD 102B may be provided with text based instructions on how to enter the sixteen digit PAN 165 into an e-commerce website. Exemplary text based instructions may include where to find the expiration date associated with the sixteen digit PAN 165 and what to enter if a card verification value ("CVV") or card identification ("CID") number is requested by a merchant 120.

Figure 7A:
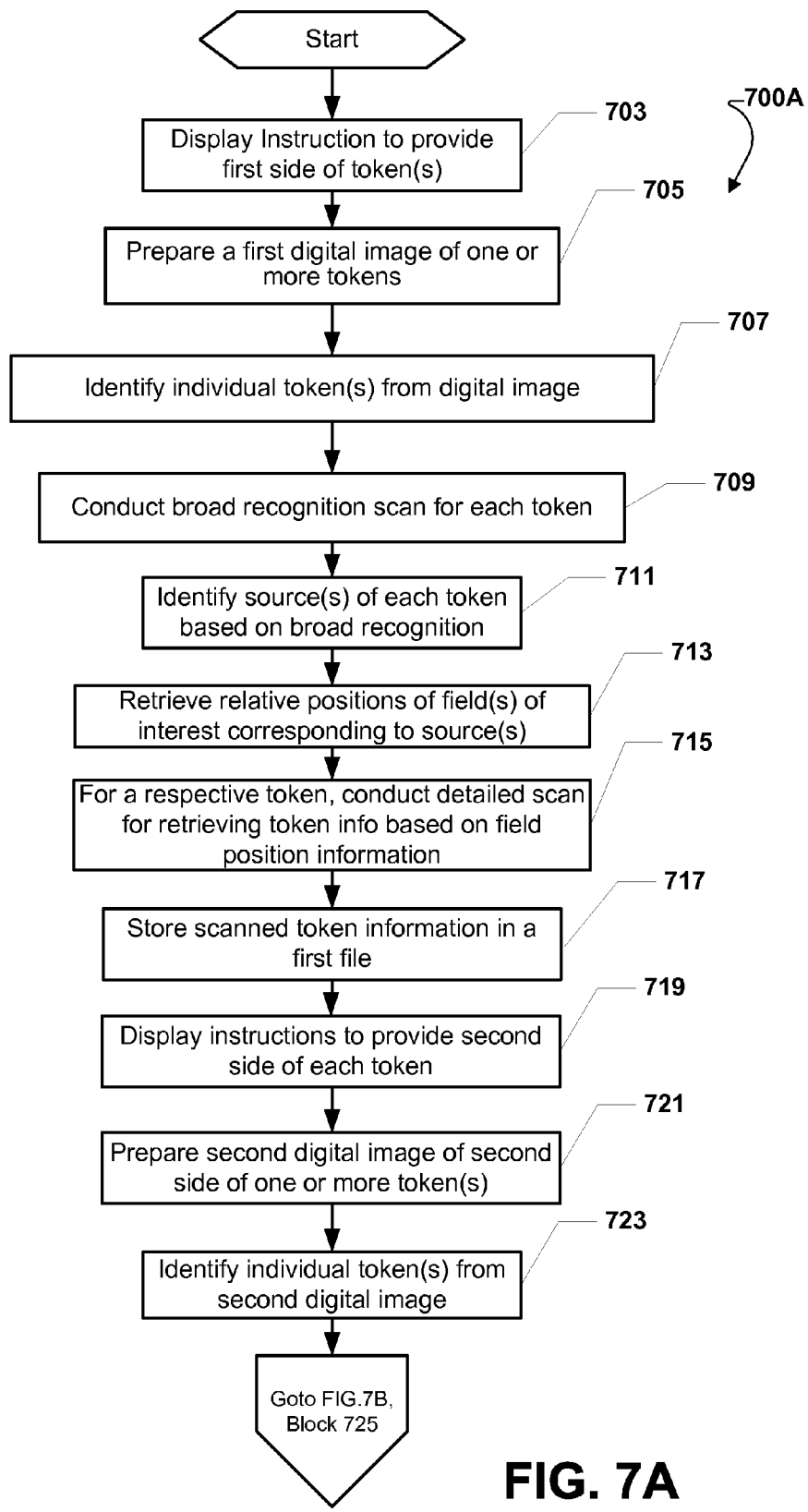
FIGS. 7A-7C are flowcharts illustrating a method for capturing token data with a PCD.
Figure 7B:
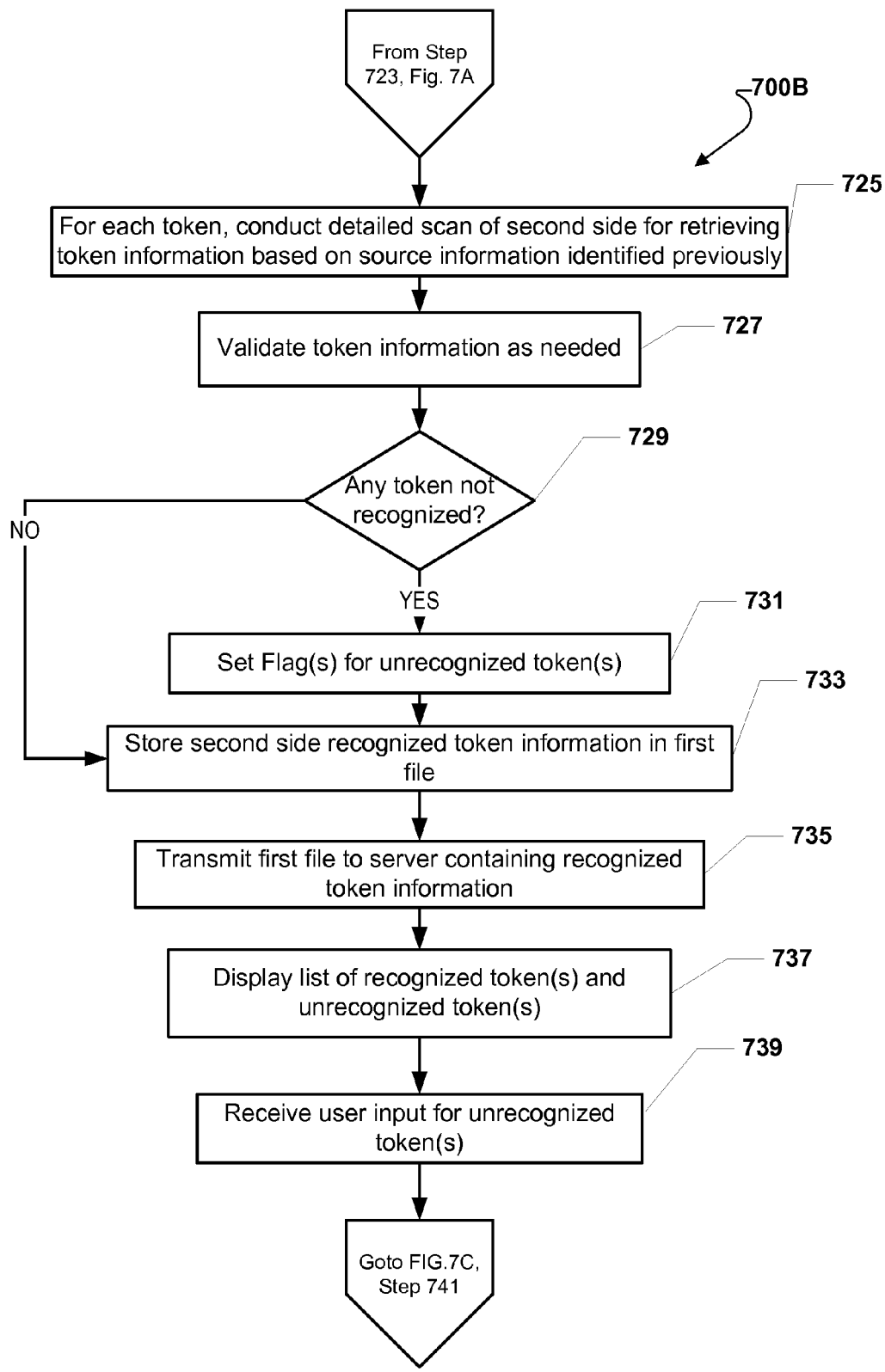
Figure 7C:
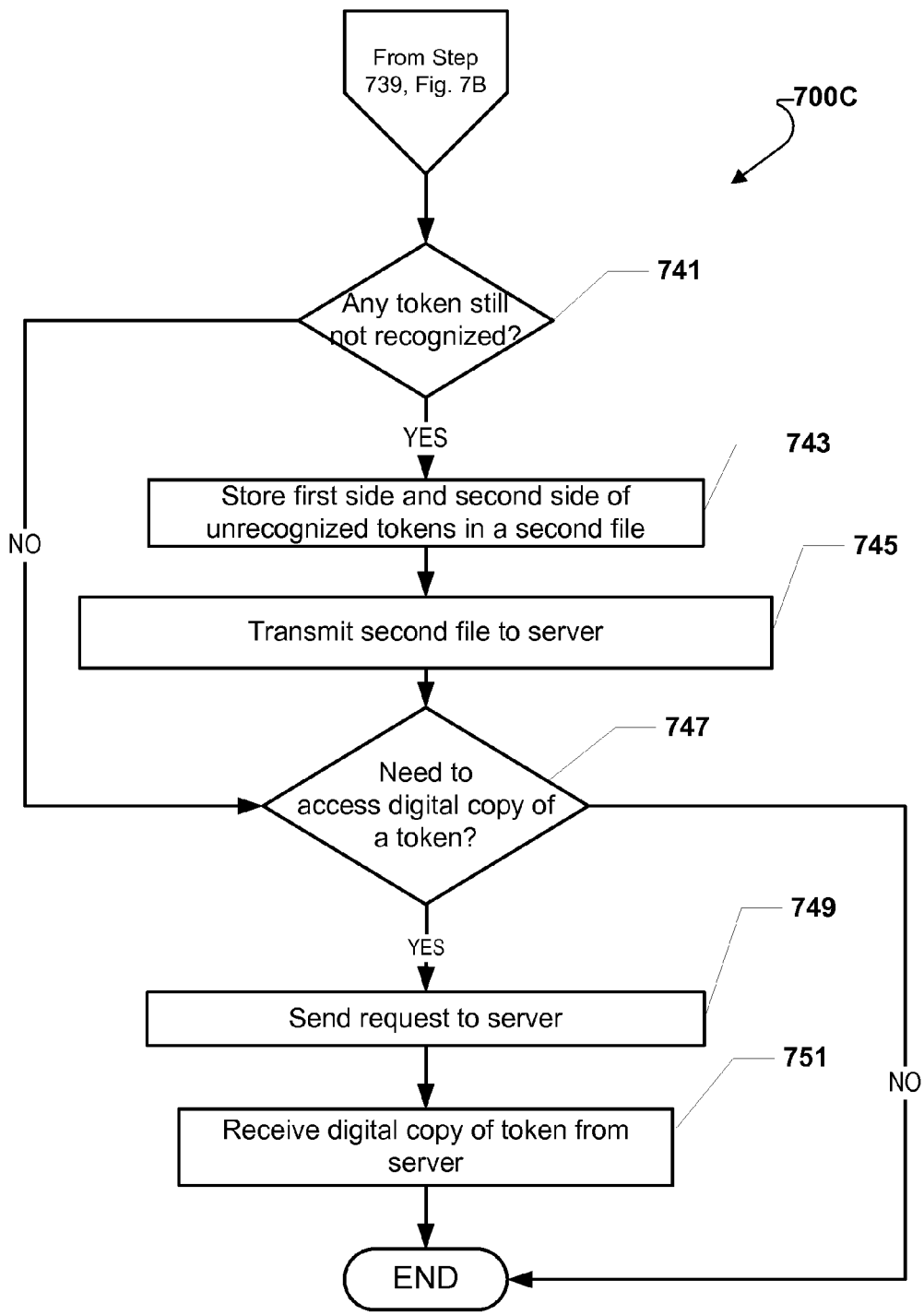

FIGS. 7A-7C are flowcharts illustrating a method 700 for capturing token data with a PCD 102. In FIG. 7A, block 703 is the first step in the first portion 700A of the method 700 and includes the token recognizer 105 displaying instructions on a display device 108 for an operator to provide a first side 142A of one or more tokens 140 as illustrated in FIG. 1D.

Next, in block 705, the camera 348 may produce a first digital image or image capture 183A of the one or more tokens 140. Next, in block 707, the broad recognizer module 110 may identify individual tokens 140 from the image capture 183A. Specifically, in this stage, the broad recognizer module 110 may produce one or more geometries or scan bars 177 of FIG. 1D that circumscribe or outline the borders of respective tokens 140.

Next, in block 709, the broad recognizer module 110 may conduct a broad recognition scan for each token 140 that is outlined or circumscribed by the geometries or scan bars 177. As noted above, during this stage, the broad recognizer module 110 may be "looking" or scanning for larger characteristics or elements of a particular token 140, such as graphical icons and/or logos, relative to the detailed or smaller character recognition scan performed by the optical character recognition (OCR) module 115 that is performed later in the process and is discussed above and below.

In block 711, the broad recognizer module 110 identifies the one or more sources associated with each token 140. In other words, the broad recognizer module 110 compares the objects or elements from its scan in block 709 to the objects or elements in the database of the temporary storage 130 to determine if there are matches. And based on those matches, the broad recognizer module 110 may determine the merchant and/or service provider associated with the objects or elements uncovered from the scan in block 709.

Next in block 713, the broad recognizer module 110 may retrieve positions of one or more fields of interest positioned within certain regions of a token 140 and that correspond to regions that were selected by a token source such as a merchant and/or service provider. The broad recognizer module 110 may pass this field information to the optical character recognition module 115.

Subsequently, in block 715, for each respective token 140 in the image scan 183A, the optical character recognition module 115 may conduct a detailed scan for retrieving consumer information from the image 183A of the token 140 based on the field position information that the OCR module 115 received from the broad recognizer module 110 in step 713. In block 717, the OCR module 115 may pass its scanned consumer information to a first file that is stored in the temporary storage 130.

In block 719, the token recognizer 105 may display instructions on the display screen 108 for the operator of the PCD 102 to provide a second side of each token 140 that was captured with the first image scan 183A. Next, in block 721, the camera 348 may prepare a second digital image or image capture 183B of a second side 142B of one or more tokens 140 as illustrated in FIG. 1E.

In block 723, similar to block 707, the broad recognizer module 110 may identify the individual tokens 140 from the second digital image or image scan 183B. In this stage, the broad recognizer module 110 may produce the one or more geometries or scan bars 177 that outline or circumscribed the geometries of the respective tokens 140 contained within the image scan 183B as illustrated in FIG. 1E.

The process 700A then proceeds to block 725 of FIG. 7B. FIG. 7B illustrates a second set or portion 700B of the overall process 700. Block 725 is the first step of the second set 700B of the method 700. In block 725, the OCR module 115 may conduct a detailed scan of the second side 142B of each token 140 for retrieving consumer information based on the source information identified previously by the broad recognizer module 110 in block 711. Alternatively and not illustrated, in block 725, the broad recognizer module 110 may conduct a scan of the second side 142B of a token 140 if the broad recognizer 110 was unable to determine the source of a particular token 140 in block 711. Once the broad recognizer 110 determines or is able to identify the source of the token 140, then the detailed scan conducted by the OCR module 115 may be initiated. According to a further exemplary embodiment not illustrated, even if the broad recognizer module 110 is unable to determine the source for a particular token 140, the OCR module 115 may be permitted to conduct a detailed scan of the second side 142B of the token 140 since the OCR module 115 may be able to determine a source of a token 140 by conducting a detailed scan of the entire area contained within the geometries or scanning bars 177 produced by the broad recognizer module 110.

Next, in block 727, the OCR module 115 may pass the information it collects from its detailed scan to the validator module 125. In this block 727, the validator module 125 may verify the information collected by the OCR module 115. The OCR module 115 or the validator module 125 in this stage may also pass the scan information produced by the OCR module 11 to a machine code reader such as a bar code reader module 120. As noted above, the machine code module 120 may decipher or decode the information contained within a scanned barcode. The machine code module 120 may then pass its decoded information back to the validator module 125. The validator module 125 may check scanned information with validation codes, checksums, and other data which are specific to the information associated with a particular source such as a merchant and/or service provider.

In decision block 729, the token recognizer 105 may determine if any token 140 that has been scanned is not recognized by the token recognizer 105. If the inquiry to decision block 729 is positive, then the "Yes" branch is followed to block 731. If the inquiry to decision block 729 is negative, then the "NO" branch is followed to block 733.

In block 731, the token recognizer 105 may set one or more flags that correspond to one or more at unrecognized tokens 140. In block 733, the token recognizer 105 may store the second side recognized consumer information in the first file which is contained in the temporary storage 130. In block 735, the token recognizer 105 may transmit the first file to the server 104 that contains the recognized consumer information.

In block 737, the token recognizer 105 may display a list of recognized tokens 140 and other denies tokens 140 as illustrated in FIG. 1F. Next, in block 739, the manual entry module 135 may receive user input for any of the unrecognized tokens 140. This information may be stored in that is contained within the temporary storage 130. The process 700B then proceeds to block 741 of FIG. 7C.

FIG. 7C illustrates a third set or portion 700C of the overall method 700. The first block of the third portion 700C of the method 700 is decision block 741. In decision block 741, the token recognizer 105 determines if there are any tokens 150 which are still not recognized by either the broad recognizer module 110 and/or the OCR module 115. If the inquiry to decision block 741 is negative, then the "NO" branch is followed to decision block 747. If the inquiry to decision block 741 is positive, then the "YES" branch is followed to block 743.

In block 743, the token recognizer 105 stores the first side 742A and the second side 742B of the unrecognized tokens 140 in a second file. The second file may be contained within the temporary storage 130. In this stage, only a portion of the captured image 183A, 183B is extracted by the token recognizer 105. This portion generally includes the section of a respective captured image 183 that is circumscribed or outlined by the geometries or scan blocks 177.

As noted above, one goal of the token recognizer 105 is that it is designed to only retrieve the consumer information contained on the token 140 and not any other information that is directed to the source of the token 140, such as the merchant and/or service provider associated with the token 140. For tokens 140 which are known and supported by the mobile wallet system 150, the token recognizer 105 only retrieves consumer information from the token 140. This means that the token recognizer 105 for tokens 140 supported by the mobile wallet system 150 does not retrieve or store additional information such as color, artwork, graphical logos/icons, or trademarks present on the token 140 and associated with the source of the token 140, such as a merchant and/or service provider. This additional information, for tokens 140 supported by the mobile wallet system 150, is stored and maintained by the mobile wallet system 150 via the server 104 in the first database 160A.

This means that when the token recognizer 105 transfers consumer information for a token 140 that is supported by the mobile wallet system 150 to the server 104 from a token 104, only consumer specific information from the token 140 is transferred. For tokens 140 that are not supported by the mobile wallet system 150, that may be referred to as "unrecognized tokens," the token recognizer 105 can transfer consumer information from the token 140 as well as digital images that provide the color, artwork, graphical logos/icons, or trademarks present on the token 140. Once the mobile wallet system 150 supports a particular token 140, then this status is communicated to the token recognizer 105 so that additional non-consumer type information, such as color, artwork, graphical logos/icons, or trademarks present on the token 140, are not collected by the token recognizer 105.

In block 745, the token recognizer 105 may transmit the second file containing digital images of the first side 142A and second side 142B of the unrecognized tokens 1402B server 104. Subsequently, in decision step 747, the CPU 402 determines if an operator of the PCD 102 desires to access a digital copy of the token 140 that is now stored and maintained by the PCD 102 in combination with the mobile wallet system 150. If the inquiry to decision block 747 is positive, then the "YES" branch is followed to block 749. If the inquiry to decision block 747 is negative, then the "NO" branch is followed in which the method or process 700 ends.

In block 749, the PCD 102 and specifically its central processing unit 402 may send a request to the server 104 for a particular digital token 140C as selected by the user from the display 108 (as illustrated in FIG. 4). Next, in block 751, the PCD 102 may receive the digital copy of the token from the server 104 and it may display the digital token on the screen 108 as illustrated in FIG. 5 or FIG. 6A. The method or process 700 then ends.

Figure 8A:
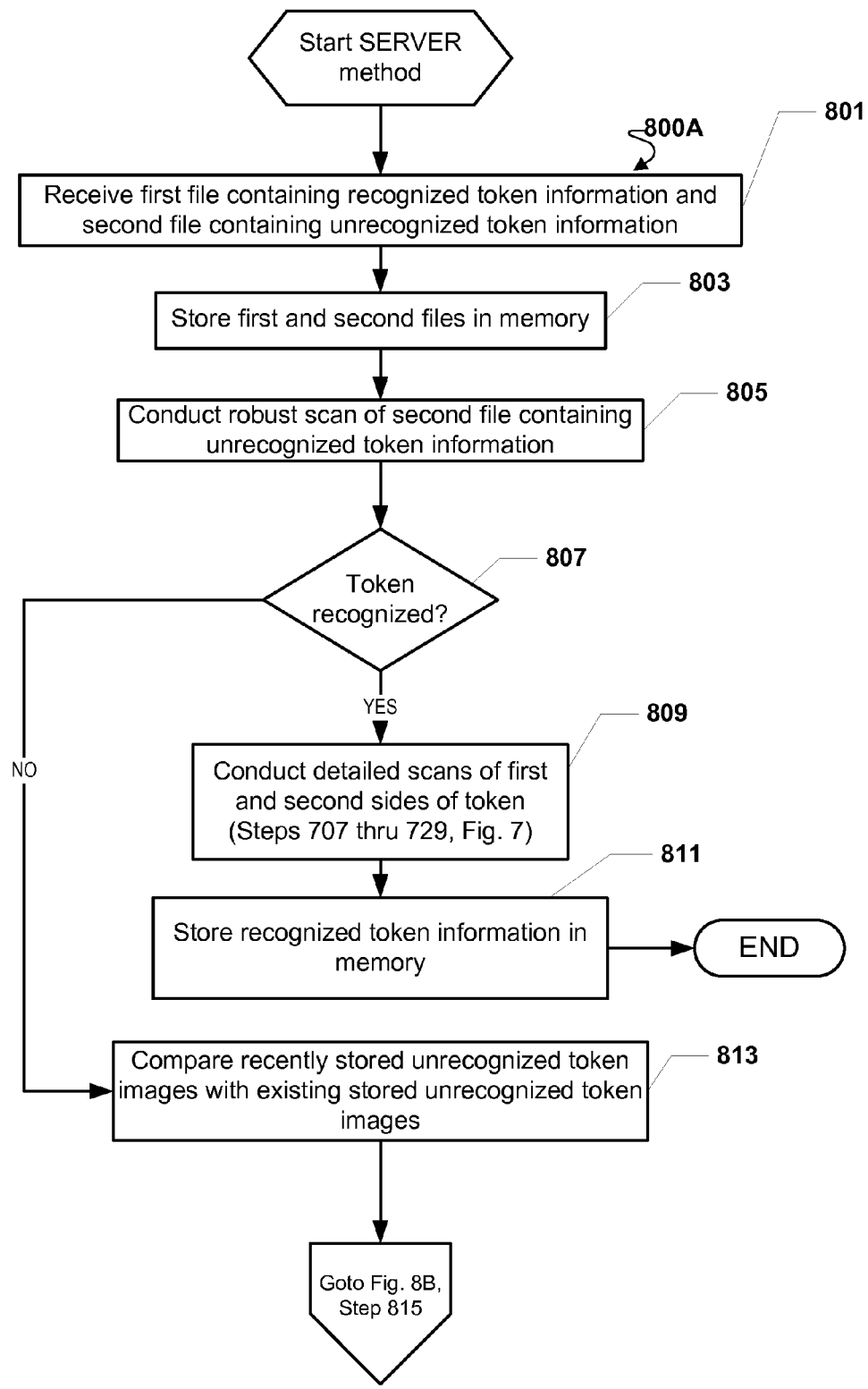
FIGS. 8A-8B are flowcharts illustrating a method for managing token data captured by a PCD.
Figure 8B:
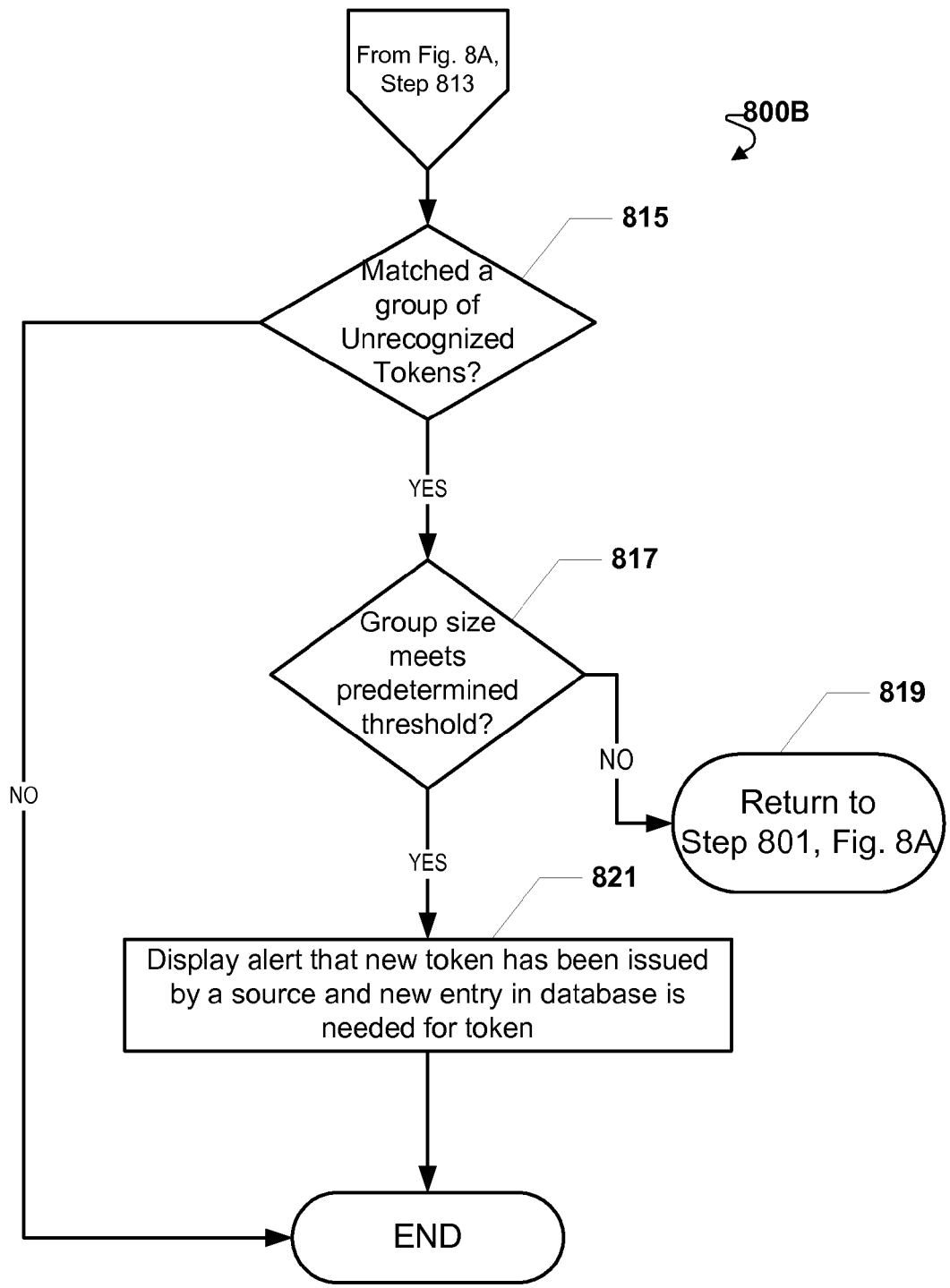

FIGS. 8A-8B are flowcharts illustrating a method 800 for managing token data captured by a PCD 102 with a server 104. Specifically, FIG. 8A illustrates a first portion or set 800A of the method 800 for managing token data with a server 104. Block 801 is the first step in the first set 800A of the method 800 for managing token data with a server 104 in block 801, a server may receive the first file containing recognized consumer information and the second file containing unrecognized consumer information.

Next, in block 803, the server 104 may store the first and second files in memory. Particularly, the server 104 may pass the first file to the mobile wallet system 150 which may store the first file in a first database 160A of known tokens 140. The server 104 may pass the second file containing the unrecognized tokens to an unsupported token matching logic module 155 which may store the second file in the database 165B of unrecognized tokens 140.

In block 805, the server may execute or initiate the robust validator module 145 which conducts a robust scan of the second file containing the unrecognized consumer information. As discussed previously in connection with FIG. 1A, the robust validator module 145 may comprise one or more complex algorithms, fingerprints, and profiles used to identify characteristics or elements of images presented on tokens 140 so that sources, that include, but are not limited to, merchants and/or service providers associated with particular tokens 140 may be determined.

Next, in decision block 807, the robust validator module 145 may determine if a particular image of a token 140 has been recognized. If the inquiry to decision block 807 is negative, then the "NO" branch is followed to block 813. If the inquiry to decision block 807 is positive, then the "YES" branch is followed to block 809.

In block 809 the robust validator module 145 may execute steps that are similar and/or substantially identical to blocks 707-729 of FIGS. 7A-7B. In other words, in block 809, the robust validator module 145 may conduct detailed scans of the partial images that contain the first and second sides 142A, 142B of the previously unrecognized token 140. Next, in block 811 the robust validator module 145 may pass the now recognized token 140 to the mobile wallet system 150 which may store the recognized tokens 140 in the first database 160A containing the recognized tokens 140. The process then may end.

Meanwhile, in block 813, if a particular image of a token 140 is not recognized by the robust validator module 145, the robust validator module 145 may pass the unrecognized token to the unsupported token matching logic module 155. In this stage, the unsupported token matching logic module 155 may compare recently stored unrecognized token images within the second database 160B with existing stored unrecognized token images that have been passed from the robust validator module 145 after its recent scan of the unrecognized tokens 140. The process then proceeds to decision block 815 of FIG. 8B.

FIG. 8B illustrates a second set or portion 800B of the overall method 800 for managing token data with a server 104. Decision block 815 is the first block of the second portion 800B of the method 800. In decision block 815, the unsupported token matching logic 155 determines if it can match a group of unrecognized tokens together meaning that the matching logic 155 has uncovered a "match" between two or more unrecognized tokens 140. If the inquiry to decision block 815 is negative, then the "NO" branch is followed in which the process 800 ends. If the inquiry to decision block 815 is positive, then the "YES" branch is followed to decision block 817.

In decision block 817, the unsupported token matching logic module 155 determines if the group of matched tokens 140 has met a predetermined threshold that may be set by an operator. For example, a threshold for matched tokens may be set according to hold number increments such as five, ten, fifteen, twenty, and other like whole number increments. If the group size of matched tokens 140 has been met, then the positive or "YES" branch is followed to block 821. If the inquiry to decision block 817 is negative, meaning that the threshold has not been met, then the "NO" branch is followed to block 819 in which the process 800 returns to block 801 of FIG. 8A.

In block 821, the unsupported token matching logic module 155 may display an alert that a new token 140 has been issued by a source, such as by a merchant and/or service provider, and that a new entry in the first database is needed for that token 140. In this block 821, an operator may create a template that contains the appropriate images for the first side 142A and second side 142B of the newly recognized token 140. The process 800 then ends.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for capturing information from physical tokens with a portable computing device:
   creating a first image of a first side of a token with a portable computing device;
   identifying a position of the token contained within the first image;
   conducting a broad recognition scan of the first side of the token to determine whether the token is supported by a mobile wallet system;
   if the token is supported by the mobile wallet system: conducting optical character recognition of the first image of the first side of the token to retrieve consumer information based on a source identified for the token; and storing the retrieved consumer information on the portable computing device; and
   if the token is not supported by the mobile wallet system: creating a second image of a second side of the token; and transmitting the first and second images of the respective first and second sides of the token to a server associated with the mobile wallet system.

2. The method of claim 1, wherein the source comprises at least one of a name of a merchant, a vendor, and a service provider.

3. The method of claim 1, further comprising retrieving a relative position of one or more fields of interest for the token, the relative position corresponding to a match in a database for the source of the token.

4. The method of claim 1, wherein the server matches the unsupported token to a predetermined threshold of other unsupported tokens.

5. The method of claim 1, further comprising conducting optical character recognition of the second side of the token to retrieve consumer information based on the source identified for the token.

6. A computer system for capturing information from physical tokens with a portable computing device, the system comprising:
   a processor operable for:
      creating a first image of a first side of a token with a portable computing device;
      identifying a position of the token contained within the first image;
      conducting a broad recognition scan of the first side of the token to determine whether the token ins supported by a mobile wallet system;
      if the token is supported by the mobile wallet system: conducting optical character recognition of the first image of the first side of the token to retrieve consumer information based on the source identified for the token; and storing the retrieved consumer information on the portable computing device; and
      if the token is not supported by the mobile wallet system: creating a second image of a second side of the token; and transmitting the first and second images of the respective first and second sides of the token to a server associated with the mobile wallet system.

7. The system of claim 6, wherein the source comprises at least one of a name of a merchant, a vendor, and a service provider.

8. The system of claim 6, wherein the processor is further operable for retrieving a relative position of one or more fields of interest for the token, the relative position corresponding to a match in a database for the source of the token.

9. The system of claim 6, wherein the server matches the unsupported token to a predetermined threshold of other unsupported tokens.

10. The system of claim 6, wherein the processor is further operable for conducting optical character recognition of the second side of the token to retrieve consumer information based on the source identified for the token.

11. A computer system for capturing information from physical tokens with a portable computing device, the system comprising:
    means for creating a first image of a first side of a token with a portable computing device;
    means for identifying a position of the token contained within the first image;
    means for conducting a broad recognition scan of the first side of the token to determine whether the token is supported by a mobile wallet system;
    means for conducting optical character recognition of the first image of the first side of the token, if the token is supported by the mobile wallet system, to retrieve consumer information based on a source identified for the token and store the retrieved consumer information on the portable computing device; and
    means for creating a second image of a second side of the token, if the token is not supported by the mobile wallet system, and transmitting the first and second images of the respective first and second sides of the unsupported token to a server associated with the mobile wallet system.

12. The system of claim 11, wherein the source comprises at least one of a name of a merchant, a vendor, and a service provider.

13. The system of claim 11, further comprising means for retrieving a relative position of one or more fields of interest for the token, the relative position corresponding to a match in a database for the source of the token.

14. The system of claim 11, wherein the server matches the unsupported token to a predetermined threshold of other unsupported tokens.

15. The method of claim 11, further comprising means for conducting optical character recognition of the second side of the token to retrieve consumer information based on the source identified for the token.

16. A computer program product comprising a non-transitory computer usable medium having a computer readable program code embodied therein, said computer readable program code adapted to be executed to implement a method for capturing information from physical tokens with a portable computing device, said method comprising:
    creating a first image of a first side of a token with a portable computing device;
    identifying a position of the token contained within the first image;
    conducting a broad recognition scan of the first side of the token to determine whether the token is supported by a mobile wallet system;
    if the token is supported by the mobile wallet system: conducting optical character recognition of the first image of the first side of the token to retrieve consumer information based on a source identified for the token;

and storing the retrieved consumer information on the portable computing device; and if the token is not supported by the mobile wallet system:
creating a second image of a second side of the token: and transmitting the first and second images of the respective first and second sides of the token to a server associated with the mobile wallet system.

17. The computer program product of claim 16, wherein the source comprises at least one of a name of a merchant, a vendor, and a service provider.

18. The computer program product of claim 16, wherein the program code implementing the method further comprises retrieving a relative position of one or more fields of interest for the token, the relative position corresponding to a match in a database for the source of the token.

19. The computer program product of claim 16, wherein the server matches the unsupported token to a predetermined threshold of other unsupported tokens.

20. The computer program product of claim 16, wherein the program code implementing the method further comprises conducting optical character recognition of the second side of the token to retrieve consumer information based on the source identified for the token.

* * * * *